(12) United States Patent
Komiya et al.

(10) Patent No.: US 6,320,015 B1
(45) Date of Patent: Nov. 20, 2001

(54) PROCESS FOR PRODUCING AROMATIC POLYCARBONATE

(75) Inventors: Kyosuke Komiya; Shinsuke Fukuoka, both of Kurashiki; Muneaki Aminaka, Okayama; Kazumi Hasegawa, Kurashiki, all of (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/674,435

(22) PCT Filed: Jun. 22, 1998

(86) PCT No.: PCT/JP98/02768

§ 371 Date: Nov. 1, 2000

§ 102(e) Date: Nov. 1, 2000

(87) PCT Pub. No.: WO99/64492

PCT Pub. Date: Dec. 16, 1999

(30) Foreign Application Priority Data

Jun. 5, 1998 (JP) .................................. 10-157602

(51) Int. Cl.$^7$ .................................. C08G 64/00
(52) U.S. Cl. .................................. 528/196; 528/198
(58) Field of Search ..................... 528/196, 198

(56) References Cited

U.S. PATENT DOCUMENTS 5,384,389   1/1995   Alewelt et al. ............... 528/168

FOREIGN PATENT DOCUMENTS

| 63223035 | 9/1988 | (JP) . |
| 8325373 | 12/1996 | (JP) . |
| 9059367 | 3/1997 | (JP) . |
| 9143257 | 6/1997 | (JP) . |
| 10168176 | 6/1998 | (JP) . |

Primary Examiner—Terressa M. Boykin
(74) Attorney, Agent, or Firm—Birch, Stewart, Kolasch & Birch, LLP

(57) ABSTRACT

Disclosed is a method for producing an aromatic polycarbonate, which comprises treating a molten aromatic polycarbonate prepolymer (obtained by reacting an aromatic dihydroxy compound with a diaryl carbonate) with an inert gas under a predetermined pressure to thereby cause the molten prepolymer to absorb the inert gas, and subjecting the resultant molten prepolymer having the inert gas absorbed therein to polymerization, under a pressure lower than the above-mentioned predetermined pressure employed for the inert gas absorption, to thereby polymerize the prepolymer to a predetermined degree of polymerization. By the method of the present invention, a high quality aromatic polycarbonate which is colorless and has excellent mechanical properties can be produced at high polymerization rate even without using a large amount of an inert gas. Further, even if the production of an aromatic polycarbonate is conducted in a continuous manner, the molecular weight of the produced aromatic polycarbonate can be maintained at a desired level, so that the high quality polycarbonate can be stably produced for a prolonged period of time. Therefore, the method of the present invention is commercially very advantageous.

16 Claims, 1 Drawing Sheet

PROCESS FOR PRODUCING AROMATIC POLYCARBONATE

This application is the national phase under 35 U.S.C. §371 of PCT International Application No. PCT/JP98/02768 which has an International filing date of Jun. 22, 1998, which designated the United States of America.

BACKGROUND OF THE INVENTION

1. Field of the Invention

The present invention relates to a method for producing an aromatic polycarbonate. More particularly, the present invention is concerned with a method for producing an aromatic polycarbonate, which comprises treating a molten aromatic polycarbonate prepolymer (obtained by reacting an aromatic dihydroxy compound with a diaryl carbonate) with an inert gas under a predetermined pressure to thereby cause the molten prepolymer to absorb the inert gas, and subjecting the resultant molten prepolymer having the inert gas absorbed therein to polymerization, under a pressure lower than the above-mentioned predetermined pressure employed for the inert gas absorption, to thereby polymerize the prepolymer to a predetermined degree of polymerization. According to the method of the present invention, it is possible to produce a high quality aromatic polycarbonate, which not only is colorless, but also has excellent mechanical properties, at high polymerization rate even without using a large amount of an inert gas. Further, according to the method of the present invention, even if the production of an aromatic polycarbonate is conducted in a continuous manner, the molecular weight of the produced aromatic polycarbonate can be maintained at a desired level, so that the above-mentioned high quality polycarbonate can be stably produced for a prolonged period of time. Therefore, the method of the present invention is commercially very advantageous.

2. Prior Art

In recent years, aromatic polycarbonates have been widely used in various fields as engineering plastics having excellent heat resistance, impact resistance and transparency. With respect to methods for producing aromatic polycarbonates, various studies have heretofore been made. Of the methods studied, a process utilizing an interfacial polycondensation between an aromatic dihydroxy compound and phosgene has been commercially practiced, wherein 2,2-bis(4-hydroxyphenyl)propane (hereinafter, frequently referred to as "bisphenol A") can be mentioned as a representative example of the aromatic dihydroxy compound.

However, the interfacial polycondensation process has problems in that it is necessary to use phosgene, which is poisonous, that a reaction apparatus is likely to be corroded with chlorine-containing compounds, such as hydrogen chloride and sodium chloride, which are by-produced, and methylene chloride which is used as a solvent in a large quantity, and that difficulties are encountered in separating and removing impurities (such as sodium chloride) and residual methylene chloride, which adversely affect properties of a produced polymer.

As a method for producing an aromatic polycarbonate from an aromatic dihydroxy compound and a diaryl carbonate, a melt transesterification process has conventionally been known, in which an aromatic polycarbonate is produced by performing an ester exchange reaction between an aromatic dihydroxy compound (such as bisphenol A) and a diaryl carbonate (such as diphenyl carbonate) in the molten state, while removing by-produced phenol from the equilibrium polycondensation reaction system. Contrary to the interfacial polycondensation process, the melt transesterification process has an advantage in that a solvent need not be used. However, the melt transesterification process has the following serious problem: namely: since the viscosity of a polymer being formed increases during the progress of the polymerization reaction, it becomes difficult to remove efficiently by-produced phenol from the polymerization reaction system, thus making it difficult to achieve a high degree of polymerization with respect to a polycarbonate produced.

Various polymerizers have been known for use in producing aromatic polycarbonates by the melt transesterification process. A vertical agitation type polymerizer vessel equipped with an agitator is widely used. The vertical agitation type polymerizer vessel equipped with an agitator is advantageous in that it exhibits high volumetric efficiency and has a simple construction, so that polymerization on a small scale can be efficiently carried out. However, the vertical agitation type polymerizer vessel has a problem in that, as mentioned above, the by-produced phenol becomes difficult to remove efficiently from the polymerization reaction system in the production of aromatic polycarbonates on a commercial scale, so that the polymerization rate becomes extremely low.

Specifically, a large-scale vertical agitation type polymerizer vessel generally has a greater ratio of the liquid volume to the vaporization area than a small-scale one. In other words, the depth of a reaction mixture in the agitation type polymerizer vessel is large and, hence, the pressure in the lower part of the agitation type polymerizer vessel is high. In such a case, even if the degree of vacuum of the polymerization reaction zone is increased in order to achieve a high degree of polymerization in the lower part of the agitation type polymerizer vessel, the polymerization proceeds under high pressure due to the weight of the reaction mixture, so that phenol and the like cannot be efficiently removed.

To solve the above-mentioned problem, various attempts have been made to remove phenol and the like from a high viscosity polymer being formed. For example, Examined Japanese Patent Application Publication No. 50-19600 (corresponding to GB-1007302) discloses the use of a screw type polymerizer device having a vent. Examined Japanese Patent Application Publication No. 52-36159 discloses the use of an intermeshing twin-screw extruder. Examined Japanese Patent Application Publication No. 53-5718 (corresponding to U.S. Pat. No. 3,888,826) describes the use of a wiped film evaporation type reactor, such as a screw evaporator or a centrifugal film evaporator. Further, Unexamined Japanese Patent Application Laid-Open Specification No. 2-153923 discloses a method in which a combination of a wiped film evaporation type apparatus and a horizontal agitation type polymerizer vessel is used.

The present inventors have developed a free-fall polymerization process in which a prepolymer is allowed to pass downwardly through a perforated plate and fall freely, so that the polymerization of the prepolymer is effected during the free fall thereof, and a guide-wetting fall polymerization process in which a prepolymer is allowed to fall along and in contact with the surface of a guide, so that the polymerization of the prepolymer is effected during the fall thereof (see, for example, U.S. Pat. No. 5,589,564).

It is widely known to effect a polymerization in an atmosphere of an inert gas in the production of aromatic polycarbonates by the melt transesterification process using the above-mentioned polymerizer devices, such as the vertical agitation type polymerizer vessel, the intermeshing twin-screw extruder and the wiped film evaporation type reactor. For example, U.S. Pat. Nos. 2,964,297 and 3,153,008 describe a method in which the production of an aromatic polycarbonate by the melt transesterification process is conducted under reduced pressure in an atmosphere of an inert gas so as to prevent occurrence of an oxidative secondary reaction (i.e., oxidation of the polymer), wherein the inert gas is introduced into a polymerizer device in a small amount, relative to the amount of the aromatic polycarbonate to be produced.

Unexamined Japanese Patent Application Laid-Open Specification No. 6-206997 (corresponding to U.S. Pat. No. 5,384,389) describes a method for producing an aromatic polycarbonate in which an aromatic monohydroxy compound, such as phenol, by-produced in the equilibrium polycondensation reaction (for producing an aromatic polycarbonate) is removed from the polymerization reaction system by using a large amount of an inert gas. Specifically, in this method, an aromatic polycarbonate is produced by performing the equilibrium polycondensation reaction while continuously introducing an inert gas, together with a molten oligocarbonate, into a heated polymerizer device under atmospheric pressure or under superatmospheric pressure in an amount of 1 $m^3$ or more per kg of the oligocarbonate, and removing by distillation phenol or the like (which is by-produced in the equilibrium polycondensation reaction) in such a form as entrained by the inert gas. However, such a method (in which the production of an aromatic polycarbonate is conducted while removing the by-produced aromatic monohydroxy compound, such as phenol, from the polymerizer device by using a large amount of the inert gas) has a problem in that, for recycling the inert gas used in the polymerization reaction, it is necessary to separate the aromatic monohydroxy compound (such as phenol) from the inert gas by using a large separation apparatus.

Unexamined Japanese Patent Application Laid-Open Specification No. 6-248067 describes a method for producing an aromatic polycarbonate, which comprises producing a low molecular weight polycarbonate having a viscosity average molecular weight of from 1,000 to 25,000 in a first reaction zone, and polymerizing the produced low molecular weight polycarbonate in a second reaction zone to thereby obtain a final polycarbonate having a viscosity average molecular weight of from 10,000 to 50,000, wherein an inert gas is introduced into the first reaction zone and the second reaction zone in amounts of 0.01 to 20 and 0.002 to 10, respectively, each in terms of the weight ratio of the inert gas to the aromatic dihydroxy compound. Also in this method, the inert gas is used for removing by distillation the aromatic monohydroxy compound (such as phenol), which is by-produced in the equilibrium polycondensation reaction, from the reaction system in such a form as entrained by the inert gas, so that the inert gas is used in a large amount. Therefore, this method has the same problem as mentioned above in connection with Unexamined Japanese Patent Application Laid-Open Specification No. 6-206997.

In the above-mentioned U.S. Pat. No. 5,589,564 disclosing the method which has been developed by the present inventors and in which the polymerization of a prepolymer is conducted by allowing the prepolymer to pass downwardly through a perforated plate and fall along and in contact with the surface of a guide, it is described that a colorless, high quality polycarbonate can be produced at high polymerization rate. In the Working Examples of this patent document, a small amount of an inert gas is introduced into the polymerizer device. Further, in Unexamined Japanese Patent Application Laid-Open Specification No. 8-325373, the present inventors proposed a method in which the polymerization of a prepolymer is conducted by allowing the prepolymer to fall along and in contact with the surface of a guide, wherein the ratio of the partial pressure of the aromatic monohydroxy compound contained in the inert gas to the partial pressure of the inert gas, is controlled within such a specific range that the recovery of the inert gas can be conducted even without using a large apparatus.

In conventional methods in which an attempt is made to produce an aromatic polycarbonate by efficiently withdrawing phenol and the like from the polymerization reaction system by using an inert gas, as in the cases of the above-mentioned Unexamined Japanese Patent Application Laid-Open Specification Nos. 6-206997 and 6-248067, the inert gas is continuously introduced into a polymerizer so as to reduce the partial pressure of phenol and the like in the polymerizer device, to thereby advance the polymerization reaction. In the above-mentioned methods, however, for effectively increasing the polymerization rate, it is necessary to use a large amount of the inert gas. Further, with respect to all of the above-mentioned methods using a large amount of the inner gas (in which the inert gas is introduced into only a polymerizer device to thereby remove by distillation the by-produced aromatic monohydroxy compound in such a form as entrained by the inert gas), such methods are not satisfactorily effective for constantly producing an aromatic polycarbonate having not only a desired molecular weight, but also excellent mechanical properties.

SUMMARY OF THE INVENTION

In this situation, for solving the above-mentioned various problems accompanying the melt transesterification process using an inert gas, the present inventors have made extensive and intensive studies. As a result, they have unexpectedly found that, in the production of an aromatic polycarbonate by the melt transesterification process, by providing a step for absorbing a small amount of an inert gas into a molten aromatic polycarbonate prepolymer before the step for polymerizing the molten prepolymer, not only can a high quality aromatic polycarbonate which is colorless and has excellent mechanical properties be produced at high polymerization rate even without using a large amount of an inert gas, but also the molecular weight of the produced aromatic polycarbonate can be maintained at a desired level, so that the above-mentioned high quality aromatic polycarbonate can be stably produced for a prolonged period of time. The present invention has been completed, based on this novel finding.

Accordingly, it is an object of the present invention to provide a method for producing an aromatic polycarbonate by the melt transesterification process (which is free from the problems accompanying the conventional phosgene process, such as a difficulty in separating from the polymer the impurities and the methylene chloride used as a solvent), which is commercially very advantageous not only in that a high quality aromatic polycarbonate which is colorless and has excellent mechanical properties can be produced at high polymerization rate even without using a large amount of an inert gas, but also in that, even if the production of the aromatic polycarbonate is conducted in a continuous manner, the molecular weight of the produced aromatic polycarbonate can be maintained at a desired level, so that the above-mentioned high quality aromatic polycarbonate can be stably produced for a prolonged period of time.

It is another object of the present invention to provide an aromatic polycarbonate obtained by the above-mentioned method, which has not only high quality, but also has a desired molecular weight.

The foregoing and other objects, features and advantages of the present invention will be apparent from the following detailed description and appended claims taken in connection with the accompanying drawing.

Figure 1:
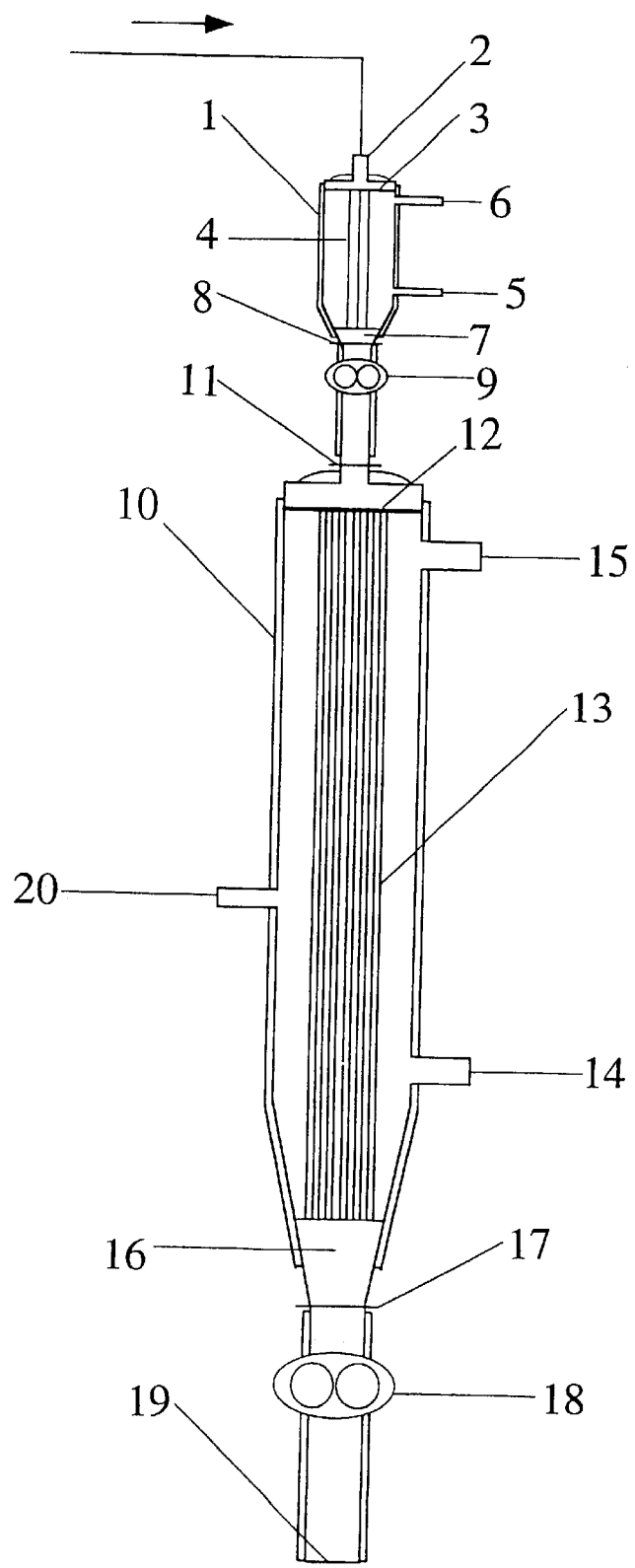
FIG. 1 is a diagrammatic view of one form of a production system used for practicing the method of the present invention.

(Description of reference numerals)
1: Inert gas absorption device
2: Inlet for a molten prepolymer
3: Distribution plate for a molten prepolymer
4, 13: Column-shaped guide
5: Introduction port for an inert gas
6: Vent used if desired
7: Molten prepolymer having an inert gas absorbed therein
8: Outlet for a molten prepolymer having an inert gas absorbed therein
9: Pump for discharging a molten prepolymer having an inert gas absorbed therein
10: Polymerizer device
11: Inlet for a molten prepolymer having an inert gas absorbed therein
12: Distribution plate for a molten prepolymer having an inert gas absorbed therein
14: Introduction port for an inert gas, used if desired
15: Vacuum vent
16: Aromatic polycarbonate
17: Outlet of polymerizer device 10 for an aromatic polycarbonate
18: Pump for discharging an aromatic polycarbonate
19: Outlet of a nozzle for withdrawal of an aromatic polycarbonate
20: Sight glass for observation of the foaming state of the molten prepolymer in polymerizer device 10

DETAILED DESCRIPTION OF THE INVENTION

According to the present invention, there is provided a method for producing an aromatic polycarbonate from an aromatic dihydroxy compound and a diaryl carbonate, which comprises the steps of:

(a) treating a molten aromatic polycarbonate prepolymer, obtained by reacting an aromatic dihydroxy compound with a diaryl carbonate, with an inert gas under a predetermined pressure $P_g$ to thereby cause the molten prepolymer to absorb the inert gas, and (b) subjecting the resultant molten prepolymer having the inert gas absorbed therein to polymerization, under a pressure $P_p$ lower than the predetermined pressure $P_g$ employed in the step (a) for inert gas absorption, to thereby polymerize the prepolymer to a predetermined degree of polymerization.

For an easy understanding of the present invention, the essential features and various preferred embodiments of the present invention are enumerated below.

1. A method for producing an aromatic polycarbonate from an aromatic dihydroxy compound and a diaryl carbonate, which comprises the steps of:

(a) treating a molten aromatic polycarbonate prepolymer, obtained by reacting an aromatic dihydroxy compound with a diaryl carbonate, with an inert gas under a predetermined pressure $P_g$ to thereby cause the molten prepolymer to absorb the inert gas, and (b) subjecting the resultant molten prepolymer having the inert gas absorbed therein to polymerization, under a pressure $P_p$ lower than the predetermined pressure $P_g$ employed in the step (a) for inert gas absorption, to thereby polymerize the prepolymer to a predetermined degree of polymerization.

2. The method according to item 1 above, wherein the pressure $P_g$ employed in the step (a) for inert gas absorption is the same as or higher than a reaction pressure employed for obtaining the molten prepolymer to be treated in the step (a).

3. The method according to item 1 or 2 above, wherein a change in molecular weight of the molten prepolymer is caused during the step (a) for inert gas absorption, wherein the change in molecular weight is represented by the following formula:

$$(M_2 - M_1) \leq 500$$

wherein $M_1$ and $M_2$ respectively represent the number average molecular weights of the molten prepolymer before and after the step (a) for inert gas absorption.

4. The method according to item 1, 2 or 3 above, wherein the pressure $P_g$ employed in the step (a) for inert gas absorption satisfies the following inequality (1):

$$P_g > 4 \times 10^{12} \times M_1^{-2.6871} \tag{1}$$

wherein $P_g$ represents the pressure (unit: Pa) employed in the step (a) and $M_1$ represents the number average molecular weight of the molten prepolymer before the step (a).

5. The method according to any one of items 1 to 4 above, wherein:

when $M_2$ is less than 5,178, the pressure $P_p$ employed in the step (b) for prepolymer polymerization satisfies the following inequality (2):

$$P_g > P_p > -0.056 \times M_2 + 290 \tag{2}$$

wherein $P_g$ and $P_p$ respectively represent the pressures (unit: Pa) employed in the step (a) for inert gas absorption and in the step (b) for prepolymer polymerization, and $M_2$ represents the number average molecular weight of the molten prepolymer after the step (a) for inert gas absorption, and when $M_2$ is 5,178 or more, the pressure $P_p$ employed in the step (b) for prepolymer polymerization satisfies the following inequality (3):

$$P_g > P_p > 0 \tag{3}$$

wherein $P_g$ and $P_p$ are as defined for the inequality (2).

6. The method according to any one of items 1 to 5 above, wherein the step (b) for prepolymer polymerization is performed by a guide-wetting fall polymerization process in which the molten prepolymer is allowed to fall along and in contact with the surface of a guide so that polymerization of the molten prepolymer is effected during the fall thereof.

7. The method according to item 6 above, wherein the molten prepolymer falling along and in contact with the surface of the guide maintains a foaming state throughout the step (b) for prepolymer polymerization.

8. The method according to any one of items 1 to 7 above, wherein the molten prepolymer having the inert gas absorbed therein is continuously fed to a polymerization zone for effecting the polymerization of the molten prepolymer in the step (b) and the resultant aromatic polycarbonate produced in the step (b) is continuously withdrawn from the polymerization zone, so that the step (b) for prepolymer polymerization is continuously performed.

9. The method according to any one of items 1 to 8 above, wherein the inert gas is nitrogen.

10. The method according to any one of items 1 to 9 above, wherein, in the step (a) for inert gas absorption, the inert gas is absorbed in the molten prepolymer in an amount of from 0.0001 to 1 N liter per kg of the molten prepolymer, wherein the N liter means the volume in terms of liter or liters as measured under the normal temperature and pressure conditions.

11. An aromatic polycarbonate produced by the method of any one of items 1 to 10 above.

12. A system for producing an aromatic polycarbonate, comprising:
(A) an inert gas absorption device for causing a molten aromatic polycarbonate prepolymer, obtained by reacting an aromatic dihydroxy compound with a diaryl carbonate, to absorb an inert gas under a predetermined pressure $P_g$ to thereby obtain a molten prepolymer having the inert gas absorbed therein,
(B) a polymerizer device for polymerizing the inert gas-absorbed molten prepolymer under a pressure $P_p$ lower than the predetermined pressure $P_g$ employed for obtaining the inert gas-absorbed molten prepolymer, and
(C) a pipe for transferring the inert gas-absorbed molten prepolymer from the absorption device (A) to the polymerizer device (B), the pipe (C) being provided with means for controlling the flow rate of the inert gas-absorbed molten prepolymer passing therethrough, the absorption device (A) and the polymerizer device (B) being arranged in this order and connected to each other through the pipe (C),
the absorption device (A) comprising an absorption casing having an inlet for the molten aromatic polycarbonate prepolymer, an introduction port for the inert gas, an inert gas absorption zone for causing the molten aromatic polycarbonate prepolymer to absorb the inert gas to thereby obtain the inert gas-absorbed molten prepolymer, and an outlet for the inert gas-absorbed molten prepolymer,
wherein the inert gas-absorbed molten prepolymer is adapted to be withdrawn from the absorption device (A) through the outlet for inert gas-absorbed molten prepolymer, and transferred to the polymerizer device (B) through the pipe (C),
the polymerizer device (B) comprising a polymerizer casing having an inlet for the inert gas-absorbed molten prepolymer, an inert gas-absorbed molten prepolymer feeding zone positioned subsequent to and communicating with the inlet for the inert gas-absorbed molten prepolymer and a polymerization reaction zone positioned subsequent to the inert gas-absorbed molten prepolymer feeding zone,
the polymerizer casing having a vacuum vent for adjusting the pressure in the polymerization reaction zone and being provided with an outlet for an aromatic polycarbonate through a withdrawal pump positioned subsequent to the polymerization reaction zone,
wherein the inert gas-absorbed molten prepolymer is adapted to be transferred to enter the polymerization reaction zone through the inert gas-absorbed prepolymer feeding zone and polymerized under the pressure $P_p$ produced by means of the vacuum vent, to thereby obtain an aromatic polycarbonate, and the obtained aromatic polycarbonate is adapted to be withdrawn from the polymerizer device (B) through the outlet for an aromatic polycarbonate by means of the withdrawal pump.

13. The system according to item 12 above, wherein the polymerization reaction zone is a guide wetting-fall polymerization reaction zone which has at least one guide fixedly held therein and extending downwardly therethrough, and the guide wetting-fall polymerization reaction zone is separated from the inert gas-absorbed molten prepolymer feeding zone through an inert gas-absorbed molten prepolymer distribution plate having at least one hole, through which the inert gas-absorbed molten prepolymer feeding zone communicates with the polymerization reaction zone, the guide being arranged in correspondence with the hole of the distribution plate, and
wherein the inert gas-absorbed molten prepolymer is adapted to fall along and in contact with the guide, to thereby effect a guide-wetting fall polymerization of the inert gas-absorbed molten prepolymer.

14. The system according to item 13 above, wherein the guide is a wire.

15. The system according to item 13 above, wherein the guide is a wire net.

16. The system according to item 13 above, wherein the guide is a punched plate.

The present invention is described below in detail.

Conventionally, in any of the methods for producing an aromatic polycarbonate in which an attempt is made to remove efficiently an aromatic monohydroxy compound (such as phenol) from the polymerization reaction system by using an inert gas, the inert gas is fed to a polymerizer device. However, it has unexpectedly become clear that, by the method of the present invention in which a molten aromatic polycarbonate prepolymer is first caused to absorb a small amount of an inert gas, and the resultant molten prepolymer having the inert gas absorbed therein is then polymerized, an aromatic polycarbonate can be produced at a remarkably improved polymerization rate, as compared to the polymerization rate achieved by the conventional methods in which the inert gas absorption is not conducted with respect to the molten prepolymer and the inert gas is fed only to the polymerizer device.

In the above-mentioned conventional methods, an inert gas is continuously fed to and flowed through the inside of the polymerizer device in an attempt to increase the polymerization rate. However, by such conventional methods, the polymerization rate cannot be satisfactorily increased. Apart from this defect of the conventional methods, the reason why the polymerization rate can be increased by such conventional methods is understood to be as follows. The polymerization reaction for producing an aromatic polycarbonate is an equilibrium reaction. Therefore, by removing by-produced phenol in such a form as entrained by the inert gas from the equilibrium reaction system, the partial pressure of the phenol in the polymerizer device is lowered, so that the equilibrium of the reaction is displaced to the product side to thereby advance the polymerization reaction. The above-mentioned conventional methods, however, are disadvantageous in that, for increasing the polymerization rate, an inert gas needs to be fed to the polymerizer device in a large amount, so that various problems inevitably occur due to the use of such a large amount of inert gas.

By the method of the present invention, it has unexpectedly become possible to increase the polymerization rate by using only a small amount of inert gas. Specifically, in the present invention, the polymerization rate can be increased simply by polymerizing a molten prepolymer having absorbed therein an inert gas in such a small amount that substantially no lowering of the partial pressure of phenol occurs in the polymerizer device. Unlike the mechanism of the action and effect of the inert gas used in the conventional methods, which is explained above, the mechanism as to how the inert gas used in a small amount effectively serves to exert the excellent effects in the present invention has not yet been elucidated. According to the study made by the present inventors, it has surprisingly been observed that, when a molten prepolymer having an inert gas absorbed therein is polymerized, vigorous foaming of the molten prepolymer continuously occurs in the polymerizer device, whereby the surface of the molten prepolymer is effectively renewed. Therefore, it is presumed that the above-mentioned foaming, which occurs throughout the molten prepolymer in the polymerizer device to thereby effectively facilitate the surface renewal of the molten prepolymer, is effective for increasing the polymerization rate.

Further, it has also been unexpectedly found that, as compared to the conventional methods in which an attempt is made to produce an aromatic polycarbonate while efficiently withdrawing phenol from the polymerization reaction system by using an inert gas, the method of the present invention in which the molten prepolymer is caused to absorb an inert gas prior to the polymerization of the molten prepolymer is advantageous not only in that a high quality aromatic polycarbonate which exhibits an excellent mechanical strength can be produced, but also in that, even if the production of an aromatic polycarbonate is conducted in a continuous manner, the molecular weight of the produced aromatic polycarbonate can be maintained at a desired level, so that the above-mentioned high quality aromatic polycarbonate can be stably produced for a prolonged period of time. The reason why such excellent effects can be achieved by the method of the present invention has also not yet been elucidated, but is considered to be as follows. When the molten prepolymer is caused to absorb the inert gas, the inert gas is uniformly dispersed and/or dissolved in the molten prepolymer, so that the molten prepolymer is uniformly foamed in the polymerizer device, differing from the cases of the conventional methods in which only non-uniform foaming of the molten prepolymer slightly occurs during the polymerization thereof. It is presumed that, by virtue of such a uniform foaming of the molten prepolymer, not only can an aromatic polycarbonate having improved mechanical properties be obtained, but also the molecular weight of the produced aromatic polycarbonate can be maintained at a desired level. Thus, by the method of the present invention, all of the problems inevitably accompanying the conventional methods, in which the polymerization of an aromatic polycarbonate prepolymer is conducted while feeding an inert gas to the polymerizer device, have been simultaneously solved.

In the present invention, the terminology "aromatic dihydroxy compound" means a compound represented by the following formula:

HO—Ar—OH wherein Ar represents a divalent aromatic group.

Preferred examples of divalent aromatic groups (Ar groups) include a group represented by the following formula:

—Ar$^1$—Y—Ar$^2$— wherein each of Ar$^1$ and Ar$^2$ independently represents a divalent carbocyclic or heterocyclic aromatic group having 5 to 70 carbon atoms, and Y represents a divalent alkane group having 1 to 30 carbon atoms.

In the divalent carbocyclic or heterocyclic aromatic groups Ar$^1$ and Ar$^2$, at least one hydrogen atom may be replaced by a substituent which does not adversely affect the reaction, such as a substituent selected from the group consisting of a halogen atom, an alkyl group having 1 to 10 carbon atoms, an alkoxy group having 1 to 10 carbon atoms, a phenyl group, a phenoxy group, a vinyl group, a cyano group, an ester group, an amide group and a nitro group.

Preferred examples of heterocyclic aromatic groups Ar$^1$ and Ar$^2$ include an aromatic group having at least one hetero atom, such as a nitrogen atom, an oxygen atom or a sulfur atom.

Examples of divalent aromatic groups Ar$^1$ and Ar$^2$ include an unsubstituted or substituted phenylene group, an unsubstituted or substituted biphenylene group and an unsubstituted or substituted pyridylene group. Substituents for Ar$^1$ and Ar$^2$ are as described above.

Examples of divalent alkane groups (Y groups) include organic groups respectively represented by the following formulae:

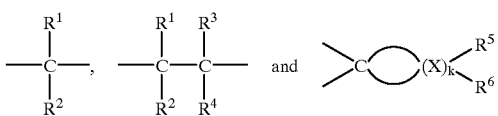

wherein each of R$^1$, R$^2$, R$^3$ and R$^4$ independently represents a hydrogen atom, an alkyl group having 1 to 10 carbon atoms, an alkoxy group having 1 to 10 carbon atoms, a cycloalkyl group having 5 to 10 ring-forming carbon atoms, a carbocyclic aromatic group having 5 to 10 ring-forming carbon atoms or a carbocyclic aralkyl group having 6 to 10 ring-forming carbon atoms; k represents an integer of from 3 to 11; each X represents a carbon atom and has R$^5$ and R$^6$ bonded thereto; each R$^5$ independently represents a hydrogen atom or an alkyl group having 1 to 6 carbon atoms, and each R$^6$ independently represents a hydrogen atom or an alkyl group having 1 to 6 carbon atoms, wherein R$^5$ and R$^6$ are the same or different; and wherein, in each of R$^1$, R$^2$, R$^3$, R$^4$, R$^5$ and R$^6$, at least one hydrogen atom may be replaced by a substituent which does not adversely affect the reaction, such as a substituent selected from the group consisting of a halogen atom, an alkyl group having 1 to 10 carbon atoms, an alkoxy group having 1 to 10 carbon atoms, a phenyl group, a phenoxy group, a vinyl group, a cyano group, an ester group, an amide group and a nitro group.

Specific examples of divalent aromatic groups (Ar groups) include groups respectively represented by the following formulae:

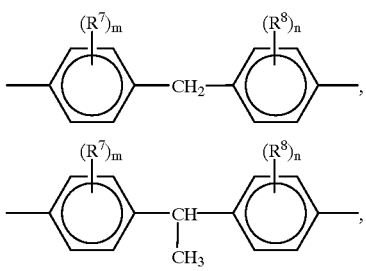

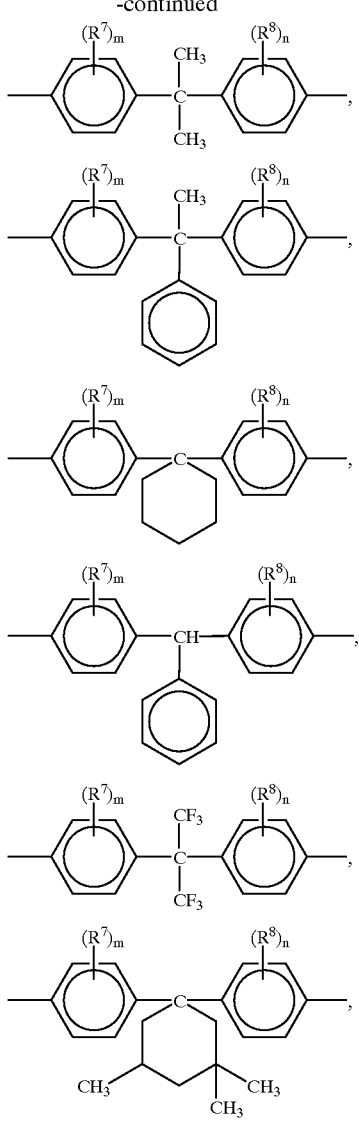

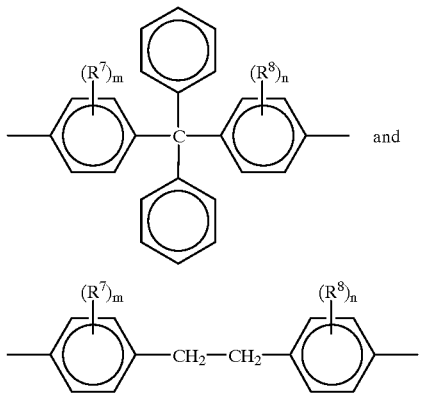

wherein each of $R^7$ and $R^8$ independently represents a hydrogen atom, a halogen atom, an alkyl group having 1 to 10 carbon atoms, an alkoxy group having 1 to 10 carbon atoms, a cycloalkyl group having 5 to 10 ring-forming carbon atoms, or a phenyl group; each of m and n independently represents an integer of from 1 to 4, with the proviso that when m is an integer of from 2 to 4, the $R^7$'s are the same or different, and when n is an integer of from 2 to 4, the $R^8$'s are the same or different.

Further examples of divalent aromatic groups (Ar groups) include a group represented by the following formula:

$$-Ar^1-Z-Ar^2-$$

wherein $Ar^1$ and $Ar^2$ are as defined above; and Z represents a single bond or a divalent group, such as —O—, —CO—, —S—, —SO$_2$, —SO—, —COO—, or —CON($R^1$)—, wherein $R^1$ is as defined above.

Specific examples of such divalent aromatic groups (Ar groups) include groups respectively represented by the following formulae:

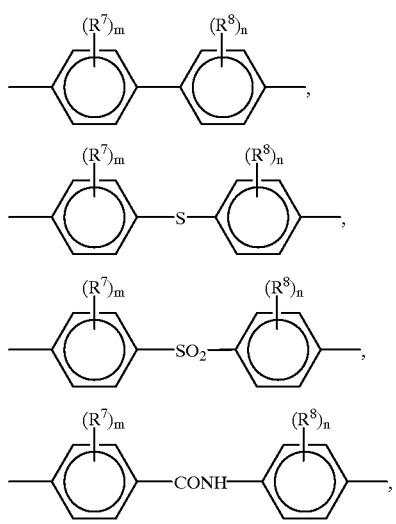

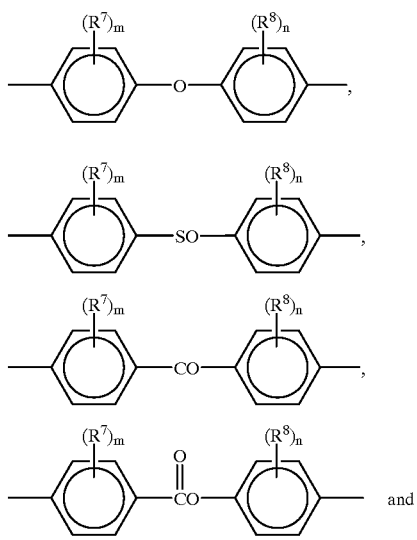

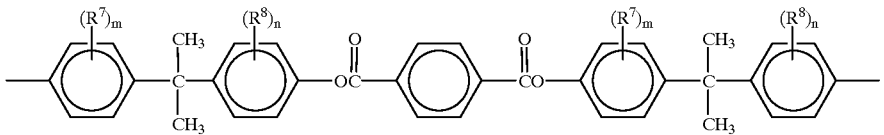

wherein $R^7$, $R^8$, m and n are as defined above.

Further examples of divalent aromatic groups (Ar groups) include an unsubstituted or substituted phenylene, an unsubstituted or substituted naphthylene, and an unsubstituted or substituted pyridylene.

In the method of the present invention, the aromatic dihydroxy compounds can be used individually or in combination. Representative examples of aromatic dihydroxy compounds include bisphenol A.

In the method of the present invention, a trivalent aromatic hydroxy compound can be used for the purpose of introducing a branched structure into the aromatic polycarbonate, as long as the desired effects of the present invention can be achieved.

The diaryl carbonate used in the present invention is represented by the following formula:

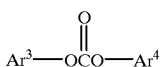

wherein each of $Ar^3$ and $Ar^4$ independently represents a monovalent aromatic group.

In each of $Ar^3$ and $Ar^4$, which independently represents a monovalent carbocyclic or heterocyclic aromatic group, at least one hydrogen atom may be replaced by a substituent which does not adversely affect the reaction, such as a substituent selected from the group consisting of a halogen atom, an alkyl group having 1 to 10 carbon atoms, an alkoxy group having 1 to 10 carbon atoms, a phenyl group, a phenoxy group, a vinyl group, a cyano group, an ester group, an amide group and a nitro group. $Ar^3$ and $Ar^4$ are the same or different.

Representative examples of monovalent aromatic groups $Ar^3$ and $Ar^4$ include a phenyl group, a naphthyl group, a biphenyl group and a pyridyl group. These groups may or may not be substituted with the above-mentioned substitutent or substituents.

Preferred examples of monovalent aromatic groups $Ar^3$ and $Ar^4$ include those which are respectively represented by the following formulae:

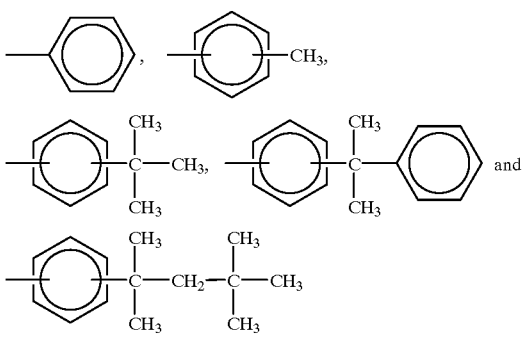

Representative examples of diaryl carbonates include a substituted or unsubstituted diphenyl carbonate compound represented by the following formula:

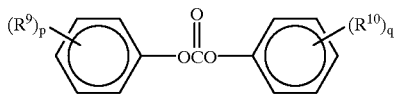

wherein each of $R^9$ and $R^{10}$ independently represents a hydrogen atom, an alkyl group having 1 to 10 carbon atoms, an alkoxy group having 1 to 10 carbon atoms, a cycloalkyl group having 5 to 10 ring-forming carbon atoms or a phenyl group; each of p and q independently represents an integer of from 1 to 5, with the proviso that when p is an integer of 2 or more, the R s are the same or different, and when q is an integer of 2 or more, the $R^{10}$'s are the same or different.

Of these diaryl carbonates, preferred are diaryl carbonates having a symmetrical configuration, such as (unsubstituted) diphenyl carbonate and a diphenyl carbonate substituted with a lower alkyl group, e.g., ditolyl carbonate and di-tert-butylphenyl carbonate. Especially preferred is diphenyl carbonate, which is the diaryl carbonate having the simplest structure.

These diaryl carbonates can be used individually or in combination.

The ratio in which the aromatic dihydroxy compound and the diaryl carbonate are used (i.e., a charging ratio) may vary depending on the types of the aromatic dihydroxy compound and diaryl carbonate employed, the polymerization conditions (such as a polymerization temperature and a polymerization pressure), the type of the polymerizer device employed, and the like. The diaryl carbonate is generally used in an amount of from 0.9 to 2.5 moles, preferably from 0.95 to 2.0 moles, more preferably from 0.98 to 1.5 moles, per mole of the aromatic dihydroxy compound.

In the present specification, the "molten aromatic polycarbonate prepolymer" (hereinafter, frequently referred to simply as "molten prepolymer") obtained by reacting an aromatic dihydroxy compound with a diaryl carbonate means a molten low molecular weight aromatic polycarbonate which has a polymerization degree which is being increased by the transesterification reaction and has not yet reached a desired level. Needless to say, such a molten prepolymer may be an oligomer.

The term "inert gas" used in the present specification means a gas which has no reactivity with the molten aromatic polycarbonate prepolymer and is stable under the polymerization conditions. Specific examples of inert gases used in the method of the present invention include nitrogen, argon, helium and carbon dioxide. Further examples of inert gases include organic compounds which are in a gaseous state at temperatures at which the aromatic polycarbonate prepolymer remains in the molten state, such as a gaseous lower hydrocarbon having 1 to 8 carbon atoms. Of the above-mentioned inert gases, nitrogen is especially preferred.

In the present specification, the step for "inert gas absorption" (i.e., step (a)) means a step in which the molten aromatic polycarbonate prepolymer is treated with an inert gas under a predetermined pressure, to thereby allow the molten prepolymer to absorb the inert gas. In the present invention, it is preferred that the inert gas absorption step is performed under conditions wherein the polymerization of the molten prepolymer hardly proceeds.

The inert gas is dispersed and/or dissolved in the molten prepolymer having the inert gas absorbed therein. The term "dispersed" used above indicates that the inert gas is present in the molten prepolymer in the form of bubbles to thereby form a gas-liquid mixed phase composed of the molten prepolymer having the inert gas dispersed therein. The term "dissolved" used above indicates that the inert gas is present in such a form as intimately mixed with the molten prepolymer to thereby form a uniform liquid phase composed of the molten prepolymer having the inert gas dissolved therein. In the method of the present invention, it is especially preferred that the inert gas is dissolved in the molten prepolymer. For efficiently dissolving the inert gas in the molten prepolymer, it is preferred to conduct the inert gas absorption step under conditions wherein the gas-liquid interface between the inert gas and the molten prepolymer is increased to thereby facilitate efficient contacting between the inert gas and the molten prepolymer, and/or conduct the inert gas absorption step under a superatmospheric pressure of an inert gas.

With respect to the type of the device used in step (a) for inert gas absorption (hereinafter, frequently referred to simply as an "absorption device"), there is no particular limitation as long as it can be used to cause the molten prepolymer to absorb the inert gas. Examples of absorption devices used in the method of the present invention include conventional devices described in "Kagaku Souchi Sekkei Sousa Shiriizu No. 2, Kaitei Gasu Kyushu (Design and Operation of Chemical Devices, No. 2, Gas Absorption (Revised Version))", pp. 49–54 (published on Mar. 15, 1981 by Kagaku Kogyosha, Inc., Japan), such as a packed column type absorption device, a tray-containing column type absorption device, a spraying device-containing column type absorption device (in which a liquid is sprayed in a gas to be absorbed in the liquid), a turbulent contact absorption device, a gas-liquid film cross-contacting type absorption device, a high-speed rotary flow type absorption device, an absorption device utilizing mechanical force (such as agitation force), and a device in which the molten prepolymer is allowed to fall along and in contact with the surface of a guide in an atmosphere of an inert gas to thereby cause the molten prepolymer to absorb the inert gas during the fall thereof. These absorption devices are designed to increase the gas-liquid interface to thereby efficiently contact a gas with a liquid. Therefore, by using any of these devices in the inert gas absorption step, it is possible to dissolve the inert gas in the molten prepolymer easily. Alternatively, in the present invention, instead of using an absorption device, the inert gas absorption may be conducted by introducing the inert gas into a molten prepolymer which is present in a pipe for the introduction of the molten prepolymer into the polymerizer device to thereby cause the molten prepolymer to absorb the inert gas in the pipe. In the method of the present invention, it is especially preferred to use a spraying device-containing column type absorption device or a device in which the molten prepolymer is allowed to fall along and in contact with the surface of a guide in an atmosphere of an inert gas, to thereby cause the molten prepolymer to absorb the inert gas during the fall thereof.

Further, as an absorption device, a device which is generally used as a polymerizer device can also be used. However, when such a device (generally used as a polymerizer device) is used as an absorption device, the device is generally operated under conditions wherein the polymerization of the molten prepolymer hardly proceeds, so that the device does not function as a polymerizer device.

In the method of the present invention, it is preferred that the change in the number average molecular weight of the molten prepolymer in the inert gas absorption step is substantially smaller than 1,000, more advantageously 500 or less, wherein the change in the number average molecular weight is calculated by the formula: $M_2-M_1$, wherein $M_1$ and $M_2$ respectively represent the number average molecular weights of the molten prepolymer before and after the inert gas absorption step. When the change $(M_2-M_1)$ in the number average molecular weight of the molten prepolymer is larger than 500, the effect of increasing the polymerization rate (which is achieved by polymerizing the molten prepolymer having absorbed therein an inert gas) is likely to become unsatisfactory. The reason for this has not yet been elucidated, but is presumed to reside in that, when the change $(M_2-M_1)$ in the number average molecular weight of the molten prepolymer is larger than 500, the by-produced aromatic monohydroxy compound (formed in the polymerization reaction which occurs during the inert gas absorption step to thereby cause the change in the number average molecular weight of the molten prepolymer) prevents the molten prepolymer from absorbing the inert gas. It is more preferred that the change $(M_2-M_1)$ in the number average molecular weight of the molten prepolymer is 400 or less, more advantageously 300 or less.

In the present invention, the number average molecular weight of polycarbonate is measured by gel permeation chromatography.

There is no particular limitation with respect to the temperature employed in step (a) for inert gas absorption. However, the temperature is generally in the range of from 150 to 350° C., preferably from 180 to 300° C., more preferably from 230 to 290° C.

In the method of the present invention, it is preferred that the pressure $P_g$ (unit: Pa) employed in step (a) for inert gas absorption is the same as or higher than the reaction pressure employed for obtaining the molten prepolymer treated in step (a), i.e., the reaction pressure employed for reacting an aromatic dihydroxy compound with a diaryl carbonate to thereby obtain the molten aromatic polycarbonate prepolymer treated in step (a) for inert gas absorption. It is more preferred that the pressure $P_g$ employed in step (a) for inert gas absorption is higher than the reaction pressure employed for obtaining the molten prepolymer treated in step (a).

With respect to the above-mentioned pressure $P_g$ (unit: Pa) employed in step (a) for inert gas absorption, which is a predetermined pressure higher than the pressure $P_p$ employed in step (b) for prepolymer polymerization conducted after the inert gas absorption, it is preferred that the pressure $P_g$ and the above-defined $M_1$ (molecular weight of the molten prepolymer before step (a) for inert gas absorption) satisfy the following inequality (1):

$$P_g > 4 \times 10^{12} \times M_1^{-2.6871} \qquad (1).$$

When the pressure $P_g$ (unit: Pa) employed in step (a) for inert gas absorption does not satisfy inequality (1) above, the effect of increasing the polymerization rate is likely to become unsatisfactory. It is especially preferred that the pressure $P_g$ (unit: Pa) employed in step (a) for inert gas absorption is atmospheric pressure or a superatmospheric pressure, since the rate of the inert gas absorption by the molten prepolymer is increased and, hence, the inert gas absorption can be conducted by using a small device.

There is no particular limitation with respect to the upper limit of the pressure $P_g$ (unit: Pa) employed in step (a) for inert gas absorption, but the pressure $P_g$ (unit: Pa) employed in step (a) for inert gas absorption is generally $2 \times 10^7$ Pa or less, preferably $1 \times 10^7$ Pa or less, more preferably $5 \times 10^6$ Pa or less.

Examples of methods for causing the molten prepolymer to absorb an inert gas include a method in which most of the inert gas fed to the inert gas absorption zone is caused to be absorbed in the molten prepolymer and a method in which a part of the inert gas fed to the inert gas absorption zone is caused to be absorbed in the molten prepolymer.

Specific examples of the former method include a method using the above-mentioned spraying device-containing column type absorption device, the above-mentioned device in which the molten prepolymer is allowed to fall along and in contact with the surface of a guide in an atmosphere of an inert gas to thereby allow the molten prepolymer to absorb the inert gas during the fall thereof, wherein the inert gas absorption is conducted while maintaining the internal pressure of the device at a predetermined level by supplementarily feeding the inert gas to the device in an amount which is substantially equal to the amount of the inert gas which has been absorbed in the molten prepolymer, and a method in which an inert gas is directly introduced into a molten prepolymer which is present in a pipe for the introduction of the molten prepolymer into the polymerizer device.

Specific examples of the latter method include a method using the above-mentioned spraying device-containing column type absorption device, a device in which the molten prepolymer is allowed to fall along and in contact with the surface of a guide to thereby allow the molten prepolymer to absorb the inert gas during the fall thereof, wherein the inert gas is fed to the device in a relatively large amount to thereby cause a part of the inert gas to be absorbed in the molten prepolymer, while withdrawing the remainder of the inert gas (which has not been absorbed in the molten prepolymer) from the device. Of the former and latter methods, the former method is preferred, because the amount of the inert gas needed in the former method is smaller than that needed in the latter method.

Further, step (a) for inert gas absorption can be conducted either in a continuous manner in which the molten prepolymer is continuously fed to the inert gas absorption device to thereby allow the molten prepolymer to absorb the inert gas, and the resultant molten prepolymer having the inert gas absorbed therein is continuously withdrawn from the device, or in a batchwise manner in which the molten prepolymer is batchwise fed to the inert gas absorption device to thereby allow the molten prepolymer to absorb the inert gas.

There is no particular limitation with respect to the amount of the inert gas absorbed in the molten prepolymer, but the amount is generally in the range of from 0.0001 to 1 N liter (Nl) preferably from 0.001 to 0.8 Nl, more preferably from 0.005 to 0.6 Nl, per kg of the molten prepolymer. The "Nl" means the volume in terms of liter or liters as measured under the normal temperature and pressure conditions. When the amount of the inert gas absorbed in the molten prepolymer is smaller than 0.0001 Nl per kg of the molten prepolymer, the effect of increasing the polymerization rate is likely to become unsatisfactory. Further, in the method of the present invention, the amount of the inert gas absorbed in the molten prepolymer need not be larger than 1 Nl per kg of the molten prepolymer.

Generally, the amount of the inert gas absorbed in the molten prepolymer can be easily determined by directly determining the amount of the inert gas fed to the inert gas absorption device. For example, when the molten prepolymer is allowed to absorb the inert gas while flowing the inert gas through the inert gas absorption device, the amount of the inert gas absorbed in the molten prepolymer can be obtained as a difference between the amount of the inert gas fed to the device and the amount of the inert gas discharged from the device. Alternatively, when a predetermined amount of the molten prepolymer is fed to the inert gas absorption device containing the inert gas having a predetermined pressure, the amount of the inert gas absorbed in the molten prepolymer can be obtained from the decrease in pressure in the inert gas absorption device, which is caused by the absorption of the inert gas by the molten prepolymer. These methods can be employed either in the case where the inert gas absorption is conducted in the above-mentioned batchwise manner in which a predetermined amount of the molten prepolymer is batchwise fed to the polymerizer device, or in the case where the inert gas absorption is conducted in a continuous manner in which the molten prepolymer is continuously fed to the inert gas absorption device and the resultant molten prepolymer having the inert gas absorbed therein is continuously withdrawn from the device.

In the present specification, the step for "prepolymer polymerization" (i.e., step (b)) means a step in which the molten prepolymer having the inert gas absorbed therein is subjected to polymerization under a pressure $P_p$ (unit: Pa) lower than the pressure $P_g$ (unit: Pa) employed in step (a) for inert gas absorption, to thereby polymerize the prepolymer to a predetermined degree of polymerization. In the step for prepolymer polymerization, it is preferred to increase the number average molecular weight of the molten prepolymer by 1,000 or more.

In the method of the present invention, when the number average molecular weight $M_2$ of the molten prepolymer after step (a) for inert gas absorption is less than 5,178, it is preferred that the pressure $P_p$ employed in step (b) for prepolymer polymerization satisfies the following inequality (2):

$$P_g > P_p > -0.056 \times M_2 + 290 \tag{2}$$

When the number average molecular weight $M_2$ of the molten prepolymer after step (a) for inert gas absorption is 5,178 or more, it is preferred that the pressure $P_p$ employed in step (b) for prepolymer polymerization satisfies the following inequality (3):

$$P_g > P_p > 0 \tag{3}$$

When $P_p$ is equal to or larger than $P_g$, the polymerization reaction hardly proceeds.

When the number average molecular weight $M_2$ is less than 5,178 and $P_p$ is equal to or less than the value of $(-0.056 \times M_2 + 290)$, the polymerization rate is likely to become disadvantageously low. This is quite unexpected from the conventional knowledge that, when a polycarbonate is produced by a transesterification reaction, the lower the pressure employed in the reaction, the easier the removal of by-produced phenol from the reaction system and, hence, the higher the reaction rate. Specifically, in the case of the method of the present invention in which the number average molecular weight $M_2$ is less than 5,178, when a molten prepolymer having an inert gas absorbed therein is polymerized, it is disadvantageous from the viewpoint of achievement of the improved polymerization rate to perform a polymerization reaction under a pressure equal to or lower than the specific pressure (unit: Pa) defined by the formula:

−0.056×$M_2$+290, which is a function of the number average molecular weight $M_2$ of the molten prepolymer (after step (a) for inert gas absorption). The reason for this has not yet been elucidated, but is considered to be as follows. When the pressure $P_p$ employed in step (b) for polymerization of the molten prepolymer having the inert gas absorbed therein is lower than the above-mentioned specific pressure, the inert gas absorbed in the molten prepolymer rapidly escapes from the molten prepolymer immediately after the introduction of the molten prepolymer into the polymerizer device, so that the molten prepolymer cannot maintain a foaming state (caused by the inert gas) in the polymerizer device.

Further, in the case where the number average molecular weight $M_2$ is less than 5,178, as apparent from inequality (2) above, the higher the molecular weight $M_2$ of the molten prepolymer, the smaller the preferred lower limit value of the pressure $P_p$ employed in step (b) for prepolymer polymerization. The reason for this is considered to be as follows. When the molecular weight $M_2$ of the molten prepolymer having the inert gas absorbed therein becomes high, the viscosity of the molten prepolymer also becomes high, so that, even if step (b) for prepolymer polymerization is conducted under a relatively low pressure, the above-mentioned rapid escape of the inert gas from the molten prepolymer does not occur.

On the other hand, in the case where the number average molecular weight $M_2$ is 5,178 or more, as apparent from inequality (3) above, there is no lower limit with respect to the polymerization pressure $P_p$, and the lower the polymerization pressure $P_p$, the higher the polymerization rate.

In the present invention, the inert gas need not be fed to the polymerizer device, but may optionally be fed to the polymerizer device.

In the case of conventional methods in which the inert gas absorption is not conducted with respect to the molten prepolymer and in which the inert gas is fed only to the polymerizer device, the polymerization rate is disadvantageously low, as compared to that achieved by the method of the present invention. Further, by such conventional methods, it is impossible to produce such a high quality aromatic polycarbonate as obtained by the method of the present invention, which has excellent mechanical properties. Especially, the tensile elongation of the aromatic polycarbonates produced by the conventional methods is disadvantageously low, as compared to the remarkably high tensile elongation of the aromatic polycarbonate produced by the method of the present invention. In other words, by the method of the present invention, it has become possible to produce an aromatic polycarbonate having excellent mechanical properties (especially, tensile elongation) which have not been achieved by the conventional methods. The reason for this has not yet been elucidated, but is considered to be as follows. In the method of the present invention, when the molten prepolymer is caused to absorb the inert gas in the inert gas absorption device under conditions wherein the polymerization reaction hardly proceeds, the inert gas is uniformly dispersed and/or dissolved in the molten prepolymer, so that the molten prepolymer is uniformly foamed in the polymerizer device, differing from the case of the conventional methods in which only non-uniform foaming of the molten prepolymer slightly occurs during the polymerization thereof. It is presumed that, by virtue of such a uniform foaming of the molten prepolymer, an aromatic polycarbonate is caused to exhibit not only improved mechanical properties but also a desired molecular weight.

In addition, the method of the present invention surprisingly has an advantage in that the aromatic polycarbonate obtained has a narrow molecular weight distribution, as compared to the conventional methods in which the inert gas absorption is not conducted with respect to the molten prepolymer and in which the inert gas is fed only to the polymerizer device. The reason for this has not yet been elucidated. However, it is considered that, as the excellent mechanical properties of the aromatic polycarbonate can be achieved by the method of the present invention, a uniform foaming of the molten prepolymer in the polymerizer device, which is achieved by the uniform dispersion and/or dissolution of the inert gas in the molten prepolymer, is effective for rendering the molecular weight distribution narrow with respect to the aromatic polycarbonate obtained.

In the method of the present invention, the reaction temperature employed for the reaction for producing the molten aromatic polycarbonate prepolymer from the aromatic dihydroxy compound and the diaryl carbonate or the aromatic polycarbonate is generally in the range of from 50 to 350° C., preferably from 100 to 300° C.

In the present invention, the molten aromatic polycarbonate prepolymer can be produced by a process in which the above-mentioned aromatic dihydroxy compound and the above-mentioned diaryl carbonate are subjected to condensation polymerization by transesterification in the molten state while heating in the presence or absence of a catalyst.

There is no particular limitation with respect to the type of the device used for the production of the molten prepolymer and the type of the polymerizer device used in step (b) for prepolymer polymerization. Examples of devices used for the production of the molten prepolymer and polymerizer devices used in step (b) include an agitation type reactor vessel, a wiped film type reactor, a centrifugal wiped film evaporation type reactor, a surface renewal type twin-screw kneading reactor, a twin-screw horizontal agitation type reactor, a wall-wetting fall reactor, a free-fall polymerizer device having a perforated plate (distribution plate), and a polymerizer device designed for performing a polymerization by allowing a prepolymer to fall along and in contact with the surface of a guide (hereinafter, frequently referred to as a "guide-wetting fall polymerizer device"). These various types of reactors can be used individually or in combination.

As one of the preferred modes for practicing the method of the present invention, there can be mentioned a mode in which the molten prepolymer is prepared by polymerizing the aromatic dihydroxy compound with the diaryl carbonate by using a vertical agitation type reactor vessel, and the polymerization of the molten prepolymer is performed by using a surface renewal type twin-screw kneading reactor, a twin-screw horizontal agitation type reactor, a wall-wetting fall reactor, a free-fall polymerizer device having a perforated plate, or a polymerizer device designed for performing a polymerization by allowing a prepolymer to fall along and in contact with the surface of a guide (guide-wetting fall polymerizer device). In step (b) for prepolymer polymerization, it is especially preferred to perform the polymerization by using the above-mentioned guide-wetting fall polymerizer device (with respect to the polymerization using this polymerizer device, reference can be made to, for example, U.S. Pat. No. 5,589,564). It has been found that, when step (b) for polymerizing a molten prepolymer having an inert gas absorbed therein is conducted by using the guide-wetting fall polymerizer device, vigorous foaming of the molten prepolymer constantly occurs during the fall thereof in the polymerizer device, so that the surface of the molten prepolymer is very effectively, efficiently renewed. For this reason, in the method of the present invention, it is most preferred to conduct step (b) for prepolymer polymerization by using the guide-wetting fall polymerizer device, wherein the molten prepolymer falling along and in contact with the surface of the guide maintains a foaming state throughout the step (b) for prepolymer polymerization. The above description reading "the molten prepolymer falling along and in contact with the surface of the guide maintains a foaming state throughout the step (b) for prepolymer polymerization" means that the foaming continuously occurs with respect to the whole of the molten prepolymer falling along and in contact with the guide from the upper portion of the guide through the lower portion of the guide. With respect to the foaming state of the molten prepolymer in the polymerizer device, the foaming state can be, for example, visually observed through a sight glass provided on the polymerizer device.

In general, when step (b) for prepolymer polymerization is conducted by using the guide-wetting fall polymerizer device, the molten prepolymer is allowed to pass downwardly through a perforated plate provided in the polymerizer device and fall along and in contact with the guide. The surface of the perforated plate is generally selected from a flat surface, a corrugated surface, and a surface which is thick at the central portion thereof. The shape of the perforated plate is generally selected from a circle, an ellipse, a triangle, a polygon and the like. The shape of the opening of the holes of the perforated plate is generally selected from a circle, an ellipse, a triangle, a slit, a polygon, a star and the like. The area of each hole of the perforated plate is generally from 0.01 to 100 cm$^2$, preferably from 0.05 to 10 cm$^2$, more preferably from 0.1 to 5 cm$^2$. The distance between mutually adjacent holes is generally from 1 to 500 mm, preferably from 25 to 100 mm, as measured between the centers of the mutually adjacent holes. The perforated plate may have tubes attached thereto, such that the hollow portions of the tubes serve as the holes of the perforated plate. Further, the holes of the perforated plate may have a tapered configuration wherein the diameter of the hole decreases in the direction from the upper portion thereof to the lower portion thereof or in the direction from the lower portion thereof to the upper portion thereof.

In the present specification, the term "guide" means a body which has a large value in respect of the ratio of the length of the body (as measured in the direction perpendicular to the cross-section) to the average perimeter of the cross-section of the body. There is no particular limitation with respect to the above ratio, but the ratio is generally from 10 to 1,000,000, preferably from 50 to 100,000.

There is also no particular limitation with respect to the morphology of the cross-section of the guide. Generally, the morphology of the cross-section of the guide is selected from a circle, an ellipse, a triangle, a quadrangle, a polygon having five or more sides, a star and the like. The morphology of the cross-section of the guide may be uniform or may vary along the length of the guide. The guide may be hollow. The guide may be made of a single strand, or made of a plurality of strands, wherein, for example, the strands are twisted together. Further, the guide may be a wire net or a punched plate. The surface of the guide may be smooth or rough or may have a protruding portion. There is no particular limitation with respect to the material used for the guide, but the material is generally selected from stainless steel, carbon steel, Hastelloy, nickel, titanium, chromium, other alloys, and a polymer having a high heat resistance. If desired, the surface of the guide may be treated with, for example, plating, lining, passivation, or washing with an acid or phenol.

In the wire-wetting fall polymerizer device used in the present invention, the guide is provided in correspondence with the hole of the perforated plate. With respect to the positional relationship between the guide and the perforated plate, and to the positional relationship between the guide and the hole of the perforated plate, there is no particular limitation as long as the molten prepolymer fed to the polymerizer device can pass downwardly through the perforated plate and fall along and in contact with the guide. The guide and the perforated plate may be or may not be in contact with each other.

Preferred examples of manners in which the guide is provided in correspondence with the hole of the perforated plate include: (1) a manner in which the upper end of the guide is fixed, for example, to the upper inner wall surface of the polymerizer device, such that the guide extends downwardly through the center of the hole of the perforated plate: (2) a manner in which the upper end of the guide is fixed to the upper circumferential edge of the hole, such that the guide extends downwardly through the hole of the perforated plate; and (3) a manner in which the upper end of the guide is fixed to the lower surface of the perforated plate.

Examples of methods for causing the molten prepolymer to pass downwardly through a perforated plate provided in the polymerizer device and fall along and in contact with the guide include a method in which the prepolymer is allowed to fall only by gravity and a method in which the prepolymer on the perforated plate is pressurized by using a pump or the like to thereby force the molten prepolymer to pass downwardly through a perforated plate.

With respect to the number of the holes of the perforated plate, there is no particular limitation. The number of the holes of the perforated plate varies depending on the polymerization conditions (such as a polymerization temperature and a polymerization pressure), the amount of the catalyst used, the range of the molecular weight of the produced aromatic polycarbonate, and the like. When the aromatic polycarbonate is produced at 100 kg/hr, the perforated plate is generally required to have 10 to 10 holes. With respect to the distance at which the molten prepolymer (having passed through the holes of the perforated plate) falls along and in contact with the surface of the guide, the distance is preferably from 0.3 to 50 m, more preferably from 0.5 to 30 m. The flow rate of the molten prepolymer passing through the holes of the perforated plate varies depending on the molecular weight of the prepolymer, but the flow rate of the prepolymer is generally from $10^{-4}$ to $10^4$ l/hr, preferably from $10^{-2}$ to $10^2$ l/hr, most preferably from 0.05 to 50 l/hr, per hole of the perforated plate. There is no particular limitation with respect to the time for falling the prepolymer along and in contact with the surface of the guide. However, the time is generally from 0.01 second to 10 hours. The polymer formed by allowing the prepolymer to fall along and in contact with the surface of the guide may be allowed to fall directly to the reservoir portion of the polymerizer device by gravity, or may be forcibly introduced into the reservoir portion by using a reeler. The obtained polymer may be withdrawn from the polymerizer device as a final product. Alternatively, the obtained polymer may be recycled to the wire-wetting fall polymerizer device, wherein the polymer is allowed to fall along and in contact with the surface of the guide again. In this case, if desired, it is possible to prolong the residence time of the polymer in the reservoir portion or the recycling line of the polymerizer device so that the reaction time for the polycondensation reaction is appropriately adjusted. The recycling of the obtained polymer to the polymerizer device has the following advantage. The surface area of the mixture of the recycled polymer and the molten prepolymer, which falls along and in contact with the surface of the guide, is larger than the surface area of the molten prepolymer falling along and in contact with the surface of the guide. Therefore, with respect to the mixture of the recycled polymer and the molten prepolymer, which falls along and in contact with the surface of the guide, the area of the surface renewed per unit time is large, as compared to that in the case where the obtained polymer is not recycled and only the molten prepolymer is allowed to fall along and in contact with the surface of the guide. Therefore, by recycling the obtained polymer to the polymerizer device, it becomes easy to achieve a desired degree of polymerization.

Step (b) for prepolymer polymerization can be conducted either in a batchwise manner or in a continuous manner. The expression that step (b) is "conducted in a batchwise manner" means that step (b) is conducted as follows: a predetermined amount of the molten prepolymer having the inert gas absorbed therein in step (a) for inert gas absorption is fed to a polymerization zone for effecting the polymerization of the molten prepolymer in step (b); and, after completion of the feeding of the predetermined amount of the molten prepolymer, the molten prepolymer is subjected to polymerization under a predetermined pressure to thereby polymerize the prepolymer to a predetermined degree of polymerization. The expression that step (b) is "conducted in a continuous manner" means that step (b) is conducted as follows: the molten prepolymer having the inert gas absorbed therein in step (a) for inert gas absorption is continuously fed at a predetermined flow rate to a polymerization zone to be used in step (b) and subjected to polymerization in the polymerization zone to thereby polymerize the molten prepolymer to a predetermined degree of polymerization (step (b)); and the resultant aromatic polycarbonate is continuously withdrawn from the polymerization zone.

In the present invention, step (a) for inert gas absorption can be conducted either in a batchwise manner or in a continuous manner, irrespective of whether step (b) is conducted in a batchwise manner or in a continuous manner. Therefore, as combinations of the reaction manner in step (a) and the reaction manner in step (b), there can be mentioned at least the following four combinations: a combination of step (a) conducted in a batchwise manner and step (b) conducted in a batchwise manner; a combination of step (a) conducted in a batchwise manner and step (b) conducted in a continuous manner; a combination of step (a) conducted in a continuous manner and step (b) conducted in a batchwise manner; and a combination of step (a) conducted in a continuous manner and step (b) conducted in a continuous manner. The method of the present invention can be advantageously practiced by using any of the above-mentioned four combinations. However, when the aromatic polycarbonate is produced in a large amount, it is preferred that at least one of steps (a) and (b) is conducted in a continuous manner, and it is more preferred that both steps (a) and (b) are conducted in a continuous manner.

In the present invention, it is preferred to repeat the sequence of steps (a) and (b) twice or more. In this case, it is, of course, possible that step (b) is conducted more frequently than step (a). There are various modes for repeating the sequence of steps (a) and (b). As examples of the specific modes for repeating the sequence of steps (a) and (b) by using a plurality of absorption devices and polymerizer devices, there can be mentioned a mode in which steps (a) and (b) are repeated in the order of "step (a), step (b), step (a), step (b), step (a), step (b) . . . ", and a mode in which steps (a) and (b) are repeated in the order of "step (a), step (b), step (b), step (a), step (b) . . . ". The repetition of steps (b) can be conducted by recycling the aromatic polycarbonate produced in a single polymerizer device to the polymerizer device, instead of using a plurality of polymerizer devices.

The reaction for producing the molten polycarbonate prepolymer from the aromatic dihydroxy compound and the diaryl carbonate can be performed without using a catalyst. However, if desired, the reaction can also be performed in the presence of a catalyst for the purpose of increasing the polymerization rate. With respect to the catalyst, there is no particular limitation as long as the catalyst is conventionally used in the art. Examples of catalysts include: hydroxides of an alkali metal and of an alkaline earth metal, such as lithium hydroxide, sodium hydroxide, potassium hydroxide and calcium hydroxide; alkali metal salts of, alkaline earth metal salts of and quaternary ammonium salts of boron hydride and of aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO—Ar—OLi wherein Ar represents an aryl group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1R^2R^3R^4)NB(R^1R^2R^3R^4)$ wherein $R^1$, $R^2$, $R^3$ and $R^4$ are as defined above, an d phosphonium borates represented by the formula: $(R^1R^2R^3R^4)PB(R^1R^2R^3R^4)$ wherein $R^1$, $R^2$, $R^3$ and $R^4$ are as defined above; silicon compounds, such as silicon oxide, sodium silicate, tetraalkylsilicon, tetraarylsilicon and diphenyl-ethylethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxide; and zirconium compounds, such as zirconium acetate, zirconium oxide, zirconium alkoxide, zirconium aryloxide and zirconium acetylacetone.

These catalysts can be used individually or in combination. The amount of the catalyst used is generally from $10^{-8}$ to 1% by weight, preferably from $10^{-7}$ to $10^{-1}$% by weight, based on the weight of the aromatic dihydroxy compound.

In the present invention, there is no particular limitation with respect to the material used for the inert gas absorption device, the polymerizer device and the pipe. The material is generally selected from stainless steel, carbon steel, Hastelloy, nickel, titanium, chromium, other alloys, and a polymer having a high heat resistance. If desired, the surface of the material may be treated with, for example, plating, lining, passivation, or washing with an acid or phenol. Stainless steel, nickel, glass lining and the like are especially preferred.

The number average molecular weight of the aromatic polycarbonate produced by the method of the present invention is generally in the range of from 1,500 to 100,000, preferably from 3,000 to 30,000.

It is preferred that the aromatic polycarbonate produced by the method of the present invention has recurring units each independently represented by the following formula:

wherein Ar is as defined above.

It is especially preferred that the aromatic polycarbonate has a recurring unit represented by the following formula in an amount of 85 mole % or more, based on the total weight of the recurring units of the aromatic polycarbonate:

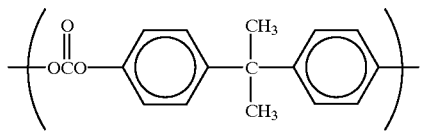

In general, the aromatic polycarbonate produced by the method of the present invention contains, as a terminal group, a hydroxyl group or an aryl carbonate group represented by the following formula:

wherein $Ar^5$ is the same as $Ar^3$ or $Ar^4$ defined above.

It is especially preferred that the aromatic polycarbonate has the terminal aryl carbonate groups, wherein 85% or more of the terminal aryl carbonate groups are phenyl carbonate groups.

When the aromatic polycarbonate contains, as terminal groups, both a hydroxyl group and an aryl carbonate group, there is no particular limitation with respect to the molar ratio of the hydroxyl group in the aromatic polycarbonate to the arylcarbonate group in the aromatic polycarbonate. However, the ratio is generally from 95/5 to 5/95, preferably from 90/10 to 10/90, more preferably from 80/20 to 20/80.

The aromatic polycarbonate produced by the method of the present invention may have a branched structure, in which a side chain is bonded to a hetero unit present in the main chain through an ester linkage or an ether linkage. The amount of the hetero units in the aromatic polycarbonate is generally 3 mole % or less, based on the mole of the carbonate linkage in the aromatic polycarbonate (see, for example, WO97/32916).

In the present invention, it is especially preferred that the aromatic polycarbonate is one containing substantially no halogen atom, which can be produced from an aromatic dihydroxy compound and a diaryl carbonate, each containing substantially no halogen atom.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, various properties were measured and evaluated by the following methods.

Number average molecular weight (Mn) of an aromatic polycarbonate:

The number average molecular weight (Mn) of an aromatic polycarbonate is measured by gel permeation chromatography (GPC) (solvent: tetrahydrofuran), utilizing the molecular weight conversion calibration curve obtained with respect to the standard monodisperse polystyrene samples, wherein the molecular weight conversion calibration curve is represented by the following formula:

$$M_{PC} = 0.3591 M_{PS}^{1.0388}$$

wherein $M_{PC}$ represents the molecular weight of the aromatic polycarbonate and $M_{PS}$ represents the molecular weight of the standard polystyrene.

Color of an aromatic polycarbonate:

Using an injection molding machine, an aromatic polycarbonate is subjected to continuous molding at a cylinder temperature of 290° C. and a mold temperature of 90° C. to thereby obtain test specimens each having a length of 50 mm, a width of 50 mm and a thickness of 3.2 mm. The color of the aromatic polycarbonate is evaluated with respect to the obtained test specimens in accordance with the CIELAB method (Commission Internationale de l'Eclairage 1976 L*a*b* Diagram), and the yellowness of the test specimens is expressed in terms of the b*-value.

Tensile elongation of an aromatic polycarbonate:

Using an injection molding machine, an aromatic polycarbonate is subjected to molding at a cylinder temperature of 290° C. and a mold temperature of 90° C. to thereby obtain a test specimen having a thickness of 3.2 mm. The tensile elongation (%) of the obtained test specimen is measured in accordance with the ASTM D638.

EXAMPLE 1

An aromatic polycarbonate was produced by using a production system shown in FIG. 1, which comprises inert gas absorption device 1 and polymerizer device 10 having therein a plurality of column-shaped guides 13.

Inert gas absorption device 1 has therein seven column-shaped guides 4 made of stainless steel SUS316, each having a diameter of 2 mm and a length of 3 m. Inert gas absorption device 1 has therein inlet 2 for a prepolymer, from which a molten aromatic polycarbonate prepolymer is fed to inert gas absorption device 1 and uniformly distributed to guides 4 through distribution plate 3. Inert gas absorption device 1 has also introduction port 5 for an inert gas at a lower portion thereof and vent 6 at an upper portion thereof. Further, inert gas absorption device 1 has an external jacket, and the outside of inert gas absorption device 1 is heated by passing a heating medium through the jacket.

Polymerizer 10 has therein 70 column-shaped guides 13 made of stainless steel SUS316, each having a diameter of 2.5 mm and a length of 8 m. Polymerizer 10 has inlet 11, from which a molten prepolymer is fed to polymerizer device 10 and uniformly distributed to guides 13 through distribution plate 12. Polymerizer 10 has also introduction port 14 for an inert gas at a lower portion thereof, and vacuum vent 15 at an upper portion thereof. Further, polymerizer device 10 has an external Jacket, and the inside of polymerizer device 10 is heated by passing a heating medium through the jacket. Further, polymerizer device 10 is provided with sight glass 20 for observing the inside of polymerizer device 10.

The molten aromatic polycarbonate prepolymer fed to inert gas absorption device 1 was produced as follows. Bisphenol A and diphenyl carbonate (molar ratio of diphenyl carbonate to bisphenol A: 1.05) were melt-mixed together at 180° C. to thereby obtain a molten mixture. The obtained molten mixture was charged into a first vertical agitation vessel, and a polymerization reaction was performed at 230° C. under a pressure of 13,300 Pa for 1 hr (residence time) to thereby obtain a reaction mixture. The obtained reaction mixture was charged into a second vertical agitation vessel, and a polymerization reaction was performed at 270° C. under a pressure of 140 Pa for 1 hr (residence time) to thereby obtain a molten aromatic polycarbonate prepolymer. The number average molecular weight ($M_1$) of the obtained molten aromatic polycarbonate prepolymer was 4,430.

In operation, the thus obtained molten aromatic polycarbonate prepolymer was continuously fed to inert gas absorption device 1 through inlet 2 at a flow rate of 50 kg/hr by flowing the molten aromatic polycarbonate prepolymer through a pipe in the direction as indicated by an arrow in FIG. 1.

The temperature in inert gas absorption device 1 was 270° C. and the pressure in inert gas absorption device 1 was 200,000 Pa.

Nitrogen gas was fed into inert gas absorption device 1 through introduction port 5 for an inert gas so as to maintain the pressure in inert gas absorption device 1 at 200,000 Pa under conditions wherein vent 6 is closed. The amount of the nitrogen gas fed to inert gas absorption device 1 was 2.0 N liters (Nl)/hr. The amount of the inert gas absorbed in the molten prepolymer was 0.04 Nl per kg of the molten prepolymer. The value of the formula: $4 \times 10^{12} \times M_1^{-2.6871}$ was 637, that is, the above-mentioned formula (1) was satisfied.

During the operation of the system of FIG. 1, the molten prepolymer having the nitrogen gas absorbed therein was discharged through outlet 8 by means of discharge pump 9 so that the amount of molten prepolymer 7 at the bottom of inert gas absorption device 1 was constantly maintained at a predetermined level.

The molten prepolymer discharged from inert gas absorption device 1 was continuously fed to polymerizer device 10 through inlet 11 and in turn distributed through distribution plate 12 and allowed to fall along and in contact with guides 13 to thereby perform a polymerization reaction of the molten prepolymer.

During the polymerization reaction, the produced aromatic polycarbonate was discharged through outlet 19 by means of discharge pump 18 so that the amount of aromatic polycarbonate 16 at the bottom of polymerizer device 10 was constantly maintained at a predetermined level. The number average molecular weight ($M_2$) of the molten prepolymer transferred from inert gas absorption device 1 to polymerizer device 10 at a point in time of 50 hours after the start of the operation was 4,450. The value of the formula: $M_2 - M_1$ was 20, and the value of the formula: $-0.056 \times M_2 + 290$ was 41. The polymerization reaction in polymerizer device 10 was performed at 270° C. under a pressure of 90 Pa. Accordingly, the above-mentioned formula (2) was satisfied. No inert gas was fed to polymerizer device 10 through introduction port 14 for an inert gas.

Through sight glass 20, it was observed that the molten prepolymer falling along and in contact with column-shaped guides 13 was in a foaming state, whereby the surface of the molten prepolymer was effectively renewed. It was also observed that the foaming continuously occurred with respect to the whole of the molten prepolymer falling along and in contact with guides 13 from upper portions of guide 13 through lower portions of guide 13.

The number average molecular weight of the aromatic polycarbonate product discharged through outlet 19 at a point in time of 50 hours after the start of the operation was 11,500, and the aromatic polycarbonate product had an excellent color (b*-value: 3.3) and a tensile elongation as high as 98%.

The aromatic polycarbonate products, which were discharged through outlet 19 at points in time of 60, 70, 80, 90, 100, 1,000, 2,000 and 3,000 hours after the start of the operation, stably had number average molecular weights of 11,500, 11,550, 11,500, 11,550, 11,500, 11,500, 11,550 and 11,500, respectively.

The results are shown in Table 1, together with the conditions employed for the operation.

EXAMPLES 2 to 5

An aromatic polycarbonate was produced in substantially the same manner as in Example 1, except that the pressure in inert gas absorption device 1 was changed.

The results are shown in Table 1, together with the conditions employed for the operation.

EXAMPLES 6 to 9

An aromatic polycarbonate was produced in substantially the same manner as in Example 1, except that the polymerization pressure was changed.

The results are shown in Table 1, together with the conditions employed for the operation.

EXAMPLE 10

An aromatic polycarbonate was produced in substantially the same manner as in Example 1, except that the production of the molten aromatic polycarbonate prepolymer fed to inert gas absorption device 1 was conducted in the following manner. Bisphenol A and diphenyl carbonate (molar ratio of diphenyl carbonate to bisphenol A: 1.05) were melt-mixed together at 180° C. to thereby obtain a molten mixture. The obtained molten mixture was charged into a first vertical agitation vessel, and a polymerization reaction was performed at 230° C. under a pressure of 13,300 Pa for 1 hr (residence time) to thereby obtain a reaction mixture. The obtained reaction mixture was charged into a second vertical agitation vessel, and a polymerization reaction was performed at 265° C. under a pressure of 1,400 Pa for 1 hr (residence time) to thereby obtain a molten aromatic polycarbonate prepolymer.

The aromatic polycarbonate products, which were discharged through outlet 19 at points in time of 50, 60, 70, 80, 90 and 100 hours after the start of the operation, stably had number average molecular weights of 9,000, 9,000, 9,050, 9,000, 9,050 and 9,000, respectively.

The results are shown in Table 1, together with the conditions employed for the operation.

EXAMPLES 11 to 13

In Examples 11 to 13, aromatic polycarbonates were produced in substantially the same manner as in Example 1, except that the temperature in inert gas absorption device 1 and the polymerization temperature in polymerizer device 10 were changed, and/or the nitrogen gas was also fed to polymerizer device 10.

In Example 11, the aromatic polycarbonate products, which were discharged through outlet 19 at points in time of 50, 60, 70, 80, 90 and 100 hours after the start of the operation, stably had number average molecular weights of 11,600, 11,600, 11,550, 11,600, 11,600 and 11,550, respectively.

The results are shown in Table 1, together with the conditions employed for the operation.

COMPARATIVE EXAMPLES 1 to 3

In Comparative Examples 1, 2 and 3, aromatic polycarbonates were produced in substantially the same manner as in Examples 1, 10 and 11, respectively, except that the molten aromatic polycarbonate prepolymer was not passed through inert gas absorption device 1 but fed directly into polymerizer device 10.

By comparing Comparative Examples 1, 2 and 3 respectively with Examples 1, 10 and 11 with respect to the difference between the number average molecular weight of the molten prepolymer fed to polymerizer device 10 and that of the aromatic polycarbonate product discharged through outlet 19, it becomes clear that the polymerization rates achieved in Comparative Examples 1, 2 and 3 are lower than those in Examples 1, 10 and 11, respectively.

In Comparative Example 3, the aromatic polycarbonate products, which were discharged through outlet 19 at points in time of 50, 60, 70, 80, 90 and 100 hours after the start of the operation, unstably had number average molecular weights of 7,600, 7,400, 7,450, 7,500, 7,650 and 7,400, respectively.

The results are shown in Table 1, together with the conditions employed for the operation.

COMPARATIVE EXAMPLE 4

An aromatic polycarbonate was produced in substantially the same manner as in Comparative Example 3, except that the amount of the nitrogen gas fed to polymerizer device 10 was changed to 200 Nl/hr. This amount of the fed nitrogen gas corresponds to 4 Nl per kg of the molten prepolymer.

The aromatic polycarbonate products, which were discharged through outlet 19 at points in time of 50, 60, 70, 80, 90 and 100 hours after the start of the operation, unstably had number average molecular weights of 7,900, 7,700, 8,050, 7,700, 7,900, and 8,000, respectively.

The results are shown in Table 1, together with the conditions employed for the operation.

EXAMPLE 14

An aromatic polycarbonate was produced in substantially the same manner as in Example 1, except that, instead of nitrogen gas, argon gas was fed into inert gas absorption device 1.

The number average molecular weight ($M_1$) of the molten prepolymer fed to inert gas absorption device 1 was 4,430. The number average molecular weight ($M_2$) of the molten prepolymer transferred from inert gas absorption device 1 to polymerizer device 10 at a point in time of 50 hours after the start of the operation was 4,450.

The number average molecular weight of the aromatic polycarbonate product discharged through outlet 19 at a point in time of 50 hours after the start of the operation was 11,500, and the aromatic polycarbonate product had an excellent color (b*-value: 3.3) and a tensile elongation as high as 98%.

EXAMPLE 15

An aromatic polycarbonate was produced in substantially the same manner as in Example 1, except that, instead of nitrogen gas, carbon dioxide gas was fed into inert gas absorption device 1.

The number average molecular weight ($M_1$) of the molten prepolymer fed to inert gas absorption device 1 was 4,430. The number average molecular weight ($M_2$) of the molten prepolymer transferred from inert gas absorption device 1 to polymerizer device 10 at a point in time of 50 hours after the start of the operation was 4,450.

The number average molecular weight of the aromatic polycarbonate product discharged through outlet 19 at a point in time of 50 hours after the start of the operation was 11,500, and the aromatic polycarbonate product had an excellent color (b*-value: 3.3) and a tensile elongation as high as 98%.

EXAMPLE 16

An aromatic polycarbonate was produced in substantially the same manner as in Example 1, except that nitrogen gas was fed into inert gas absorption device 1 through introduction port 5 for an inert gas in an amount of 20 Nl/hr, while maintaining the pressure in inert gas absorption device 1 at 200,000 Pa by the use of vent 6.

The number average molecular weight ($M_1$) of the molten prepolymer fed to inert gas absorption device 1 was 4,430. The number average molecular weight ($M_2$) of the molten prepolymer transferred from inert gas absorption device 1 to polymerizer device 10 at a point in time of 50 hours after the start of the operation was 4,520.

The number average molecular weight of the aromatic polycarbonate product discharged through outlet 19 at a point in time of 50 hours after the start of the operation was 11,300, and the aromatic polycarbonate product had an excellent color (b*-value: 3.3) and a tensile elongation as high as 98%.

EXAMPLE 17

An aromatic polycarbonate was produced in substantially the same manner as in Example 16, except that the pressure in inert gas absorption device 1 was changed to 900 Pa.

The number average molecular weight ($M_1$) of the molten prepolymer fed to inert gas absorption device 1 was 4,430. The number average molecular weight ($M_2$) of the molten prepolymer transferred from inert gas absorption device 1 to polymerizer device 10 at a point in time of 50 hours after the start of the operation was 4,730. The value of the formula: $M_2-M_1$ was 300.

The number average molecular weight of the aromatic polycarbonate product discharged through outlet 19 at a point in time of 50 hours after the start of the operation was 11,000, and the aromatic polycarbonate product had an excellent color (b*-value: 3.3) and a tensile elongation as high as 97%.

During the operation, through sight glass 20, it was observed that the molten prepolymer maintained a foaming state.

EXAMPLE 18

An aromatic polycarbonate was produced in substantially the same manner as in Example 16, except that the pressure in inert gas absorption device 1 was changed to 700 Pa.

The number average molecular weight ($M_1$) of the molten prepolymer fed to inert gas absorption device 1 was 4,430.

The number average molecular weight ($M_2$) of the molten prepolymer transferred from inert gas absorption device 1 to polymerizer device 10 at a point in time of 50 hours after the start of the operation was 4,840. The value of the formula: $M_2-M_1$ was 410.

The number average molecular weight of the aromatic polycarbonate product discharged through outlet 19 at a point in time of 50 hours after the start of the operation was 10,700, and the aromatic polycarbonate product had an excellent color (b*-value: 3.3) and a tensile elongation as high as 95%.

During the operation, through sight glass 20, it was observed that the molten prepolymer maintained a foaming state.

EXAMPLE 19

An aromatic polycarbonate was produced in substantially the same manner as in Example 16, except that the pressure in inert gas absorption device 1 was changed to 500 Pa.

The number average molecular weight ($M_1$) of the molten prepolymer fed to inert gas absorption device 1 was 4,430. The number average molecular weight ($M_2$) of the molten prepolymer transferred from inert gas absorption device 1 to polymerizer device 10 at a point in time of 50 hours after the start of the operation was 4,980. The value of the formula: $M_2-M_1$ was 550.

The number average molecular weight of the aromatic polycarbonate product discharged through outlet 19 at a point in time of 50 hours after the start of the operation was 9,900, and the aromatic polycarbonate product had an excellent color (b*-value: 3.3) and a tensile elongation as high as 92%.

During the operation, through sight glass 20, it was observed that the molten prepolymer was intermittently foaming.

EXAMPLE 20

An aromatic polycarbonate was produced in substantially the same manner as in Example 1, except that the polymerization of an aromatic molten prepolymer which has been caused to absorb nitrogen gas by using an inert gas absorption device was subjected to polymerization using a horizontal agitation type polymerizer vessel instead of polymerizer device 10, wherein the polymerizer vessel has a capacity of 1.5 m and a length of 4 m and has therein two agitators each having a revolution diameter of 0.4 m. The amount of the molten prepolymer fed to the polymerizer vessel, the polymerization temperature and the polymerization pressure are the same as those in Example 1. The revolution rate of each of the two agitators was 15 rpm.

The number average molecular weight of the aromatic polycarbonate product discharged through outlet 19 at a point in time of 50 hours after the start of the operation was 10,500, and the aromatic polycarbonate product had an excellent color (b*-value: 3.6) and a tensile elongation as high as 94%.

COMPARATIVE EXAMPLE 5

An aromatic polycarbonate was produced in substantially the same manner as in Example 20, except that the molten aromatic polycarbonate prepolymer was not passed through an inert gas absorption device but fed directly into the horizontal agitation type polymerizer vessel.

The number average molecular weight of the aromatic polycarbonate product discharged through outlet 19 at a point in time of 50 hours after the start of the operation was 8,900, and the aromatic polycarbonate product had an excellent color (b*-value: 3.9) and a tensile elongation of 89%.

EXAMPLE 21

An aromatic polycarbonate was produced in substantially the same manner as in Example 1, except that an inert gas absorption device was used which had therein no column-shaped guides.

The number average molecular weight ($M_1$) of the molten prepolymer fed to inert gas absorption device 1 was 4,430. The number average molecular weight ($M_2$) of the molten prepolymer transferred from inert gas absorption device 1 to polymerizer device 10 at a point in time of. 50 hours after the start of the operation was 4,430.

The number average molecular weight of the aromatic polycarbonate product discharged through outlet 19 at a point in time of 50 hours after the start of the operation was 11,400, and the aromatic polycarbonate product had an excellent color (b*-value: 3.3) and a tensile elongation as high as 98%.

EXAMPLE 22

An aromatic polycarbonate was produced in substantially the same manner as in Example 1, except that, as the guides for polymerizer device 10, eight (8) pieces of wire mesh (wire diameter: 2 mm) made of stainless steel SUS316, each having a width of 100 mm and a length of 8 m, were used.

The number average molecular weight ($M_1$) of the molten prepolymer fed to inert gas absorption device 1 was 4,430. The number average molecular weight ($M_2$) of the molten prepolymer transferred from inert gas absorption device 1 to polymerizer device 10 at a point in time of 50 hours after the start of the operation was 4,450.

The number average molecular weight of the aromatic polycarbonate product discharged through outlet 19 at a point in time of 50 hours after the start of the operation was 11,800, and the aromatic polycarbonate product had an excellent color (b*-value: 3.3) and a tensile elongation as high as 97%.

EXAMPLE 23

An aromatic polycarbonate was produced in substantially the same manner as in Example 1, except that, in the production of the molten aromatic polycarbonate prepolymer, 1,1-bis-(4-hydroxyphenyl)-3,3,5-trimethylcyclohexane was used instead of bisphenol A.

The number average molecular weight ($M_1$) of the molten prepolymer fed to inert gas absorption device 1 was 4,410. The number average molecular weight ($M_2$) of the molten prepolymer transferred from inert gas absorption device 1 to polymerizer device 10 at a point in time of 50 hours after the start of the operation was 4,430.

The number average molecular weight of the aromatic polycarbonate product discharged through outlet 19 at a point in time of 50 hours after the start of the operation was 11,100, and the aromatic polycarbonate product had an excellent color (b*-value: 3.3) and a tensile elongation as high as 94%.

TABLE 1

| | Inert gas absorption apparatus | | | | | Polymerization conditions | | | | (At a point in time of 50 hours after the start of the operation) | | | | |
|---|---|---|---|---|---|---|---|---|---|---|---|---|---|---|
| | | | | | | | | | | Aromatic polycarbonate | | | | |
| | Temperature (°C.) | Pressure (Pa) | $M_1$ | $M_2$ | $M_2 - M_1$ | $4 \times 10^{12} \times M_1^{-2.6871}$ | Temperature (°C.) | Pressure (Pa) | $-0.056 \times M_2 + 290$ | Amount of $N_2$ (Nl/hr) | Mn | b*-value | Tensile elongation (%) | Foaming state of column-shaped guides |
| Example 1 | 270 | 200,000 | 4,430 | 4,450 | 20 | 637 | 270 | 90 | 41 | 0 | 11,500 | 3.3 | 98 | Continuous foaming |
| Example 2 | 270 | 100,000 | 4,430 | 4,450 | 20 | 637 | 270 | 90 | 41 | 0 | 11,500 | 3.3 | 98 | Continuous foaming |
| Example 3 | 270 | 10,000 | 4,430 | 4,460 | 30 | 637 | 270 | 90 | 40 | 0 | 11,500 | 3.3 | 98 | Continuous foaming |
| Example 4 | 270 | 1,000 | 4,430 | 4,470 | 40 | 637 | 270 | 90 | 40 | 0 | 11,500 | 3.3 | 98 | Continuous foaming |
| Example 5 | 270 | 500 | 4,430 | 4,480 | 50 | 637 | 270 | 90 | 39 | 0 | 10,100 | 3.3 | 96 | Intermittent foaming |
| Example 6 | 270 | 200,000 | 4,430 | 4,450 | 20 | 637 | 270 | 70 | 41 | 0 | 11,900 | 3.3 | 98 | Continuous foaming |
| Example 7 | 270 | 200,000 | 4,430 | 4,450 | 20 | 637 | 270 | 50 | 41 | 0 | 12,800 | 3.3 | 97 | Continuous foaming |
| Example 8 | 270 | 200,000 | 4,430 | 4,450 | 20 | 637 | 270 | 200 | 41 | 0 | 9,700 | 3.3 | 98 | Continuous foaming |
| Example 9 | 270 | 200,000 | 4,430 | 4,450 | 20 | 637 | 270 | 35 | 41 | 0 | 8,100 | 3.3 | 90 | Intermittent foaming |
| Example 10 | 270 | 200,000 | 2,100 | 2,130 | 30 | 4,731 | 270 | 200 | 171 | 0 | 9,000 | 3.3 | 97 | Continuous foaming |
| Example 11 | 270 | 200,000 | 4,430 | 4,450 | 20 | 637 | 270 | 90 | 41 | 15 | 11,600 | 3.3 | 98 | Continuous foaming |
| Example 12 | 260 | 200,000 | 4,430 | 4,450 | 20 | 637 | 260 | 90 | 41 | 0 | 11,100 | 3.3 | 98 | Continuous foaming |
| Example 13 | 260 | 200,000 | 4,430 | 4,450 | 20 | 637 | 260 | 90 | 41 | 10 | 11,200 | 3.3 | 98 | Continuous foaming |
| Comparative Example 1 | — | — | 4,430 | 4,430 | — | — | 270 | 90 | 42 | 0 | 6,800 | 3.3 | 85 | No foaming |
| Comparative Example 2 | — | — | 2,100 | 2,100 | — | — | 270 | 200 | 172 | 0 | 5,900 | 3.3 | 25 | No foaming |
| Comparative Example 3 | — | — | 4,430 | 4,430 | — | — | 270 | 90 | 42 | 15 | 7,600 | 3.3 | 88 | Almost no foaming |
| Comparative Example 4 | — | — | 4.430 | 4,430 | — | — | 270 | 90 | 42 | 200 | 7,900 | 3.3 | 86 | Temporary foaming |

INDUSTRIAL APPLICABILITY

According to the method of the present invention, it is possible to produce a high quality aromatic polycarbonate, which not only is colorless, but also has excellent mechanical properties, at high polymerization rate even without using a large amount of an inert gas. Further, according to the method of the present invention, even if the production of an aromatic polycarbonate is conducted in a continuous manner, the molecular weight of the produced aromatic polycarbonate can be maintained at a desired level, so that the above-mentioned high quality polycarbonate can be stably produced for a prolonged period of time. Therefore, the method of the present invention is commercially very advantageous.

What is claimed is:

1. A method producing an aromatic polycarbonate from an aromatic dihydroxy compound and a diaryl carbonate, which comprises the steps of:

(a) treating a molten aromatic polycarbonate prepolymer, obtained by reacting an aromatic dihydroxy compound with a diaryl carbonate, with an inert gas under a predetermined pressure $P_g$ to thereby cause said molten prepolymer to absorb said inert gas, and (b) subjecting the resultant molten prepolymer having said inert gas absorbed therein to polymerization, under a pressure $P_p$ which is lower than said predetermined pressure $P_g$ employed in said step (a) for inert gas absorption, to thereby polymerize said prepolymer to a predetermined degree of polymerization in terms of a number average molecular weight as measured by gel permeation chromatography.

2. The method according to claim 1, wherein said pressure $P_g$ employed in said step (a) for inert gas absorption is the same as or higher than a reaction pressure employed for obtaining said molten prepolymer to be treated in said step (a).

3. The method according to claim 1, wherein a change in molecular weight of said molten prepolymer is caused during said step (a) for inert gas absorption, wherein said change in molecular weight is represented by the following formula:

$$(M_2-M_1) \leq 500$$

wherein $M_1$ and $M_2$ respectively represent the number average molecular weights of said molten prepolymer before and after said step (a) for inert gas absorption.

4. The method according to claim 1, wherein said pressure $P_g$ employed in said step (a) for inert gas absorption satisfies the following inequality (1):

$$P_g > 4 \times 10^{12} \times M_1^{-2.6871} \tag{1}$$

wherein $P_g$ represents the pressure (unit: Pa) employed in said step (a) and $M_1$ represents the number average molecular weight of said molten prepolymer before said step (a).

5. The method according to claim 1, wherein:

when $M_2$ is less than 5,178, the pressure $P_p$ employed in said step (b) for prepolymer polymerization satisfies the following inequality (2):

$$P_g > P_p > -0.056 \times M_2 + 290 \tag{2}$$

wherein $P_g$ and $P_p$ respectively represent the pressures (unit: Pa) employed in said step (a) for inert gas absorption and in said step (b) for prepolymer polymerization, and $M_2$ represents the number average molecular weight of said molten prepolymer after said step (a) for inert gas absorption, and when $M_2$ is 5,178 or more, the pressure $P_p$ employed in said step (b) for prepolymer polymerization satisfies the following inequality (3):

$$P_g > P_p > 0 \tag{3}$$

wherein $P_g$ and $P_p$ are as defined for said inequality (2).

6. The method according to claim 1, wherein said step (b) for prepolymer polymerization is performed by a guide-wetting fall polymerization process in which said molten prepolymer is allowed to fall along and in contact with the surface of a guide so that polymerization of said molten prepolymer is effected during the fall thereof.

7. The method according to claim 6, wherein said molten prepolymer falling along and in contact with the surface of said guide maintains a foaming state throughout said step (b) for prepolymer polymerization.

8. The method according to claim 1, wherein said molten prepolymer having said inert gas absorbed therein is continuously fed to a polymerization zone for effecting the polymerization of said molten prepolymer in said step (b) and the resultant aromatic polycarbonate produced in said step (b) is continuously withdrawn from said polymerization zone, so that said step (b) for prepolymer polymerization is continuously performed.

9. The method according to claim 1, wherein said inert gas is nitrogen.

10. The method according to claim 1, wherein, in said step (a) for inert gas absorption, said inert gas is absorbed in said molten prepolymer in an amount of from 0.0001 to 1 N liter per kg of said molten prepolymer, wherein the N liter means the volume in terms of liter or liters as measured under the normal temperature and pressure conditions.

11. An aromatic polycarbonate produced by the method of claim 1.

12. A system for producing an aromatic polycarbonate, comprising:

(A) an inert gas absorption device for causing a molten aromatic polycarbonate prepolymer, obtained by reacting an aromatic dihydroxy compound with a diaryl carbonate, to absorb an inert gas under a predetermined pressure $P_g$ to thereby obtain a molten prepolymer having said inert gas absorbed therein, (B) a polymerizer device for polymerizing said inert gas-absorbed molten prepolymer under a pressure $P_p$ lower than said predetermined pressure $P_g$ employed for obtaining said inert gas-absorbed molten prepolymer, and (C) a pipe for transferring said inert gas-absorbed molten prepolymer from said absorption device (A) to said polymerizer device (B), said pipe (C) being provided with means for controlling the flow rate of said inert gas-absorbed molten prepolymer passing therethrough, the absorption device (A) and the polymerizer device (B) being arranged in this order and connected to each other through said pipe (C), the absorption device (A) comprising an absorption casing having an inlet for the molten aromatic polycarbonate prepolymer, an introduction port for said inert gas, an inert gas absorption zone for causing said molten aromatic polycarbonate prepolymer to absorb said inert gas to thereby obtain the inert gas-absorbed molten prepolymer, and an outlet for the inert gas-absorbed molten prepolymer, wherein said inert gas-absorbed molten prepolymer is adapted to be withdrawn from said absorption device (A) through the outlet for inert gas-absorbed molten prepolymer, and transferred to said polymerizer device (B) through the pipe (C), the polymerizer device (B) comprising a polymerizer casing having an inlet for the inert gas-absorbed molten prepolymer, an inert gas-absorbed molten prepolymer feeding zone positioned subsequent to and communicating the inlet for the inert gas-absorbed molten prepolymer and a polymerization reaction zone positioned subsequent to the inert gas-absorbed molten prepolymer feeding zone, the polymerizer casing having a vacuum vent for adjusting the pressure in said polymerization reaction zone and being provided with an outlet for an aromatic polycarbonate through a withdrawal pump positioned subsequent to said polymerization reaction zone, wherein said inert gas-absorbed molten prepolymer is adapted to be transferred to enter said polymerization reaction zone through said inert gas-absorbed prepolymer feeding zone and polymerized under said pressure $P_p$ produced by means of said vacuum vent, to thereby obtain an aromatic polycarbonate, and the obtained aromatic polycarbonate is adapted to be withdrawn from the polymerizer device (B) through said outlet for an aromatic polycarbonate by means of the withdrawal pump.

13. The system according to claim 12, wherein the polymerization reaction zone is a guide wetting-fall polymerization reaction zone which has at least one guide fixedly held therein and extending downwardly therethrough, and the guide wetting-fall polymerization reaction zone is separated from the inert gas-absorbed molten prepolymer feeding zone through an inert gas-absorbed molten prepolymer distribution plate having at least one hole, through which the inert gas-absorbed molten prepolymer feeding zone communicates with the polymerization reaction zone, the guide being arranged in correspondence with the hole of the distribution plate, and wherein the inert gas-absorbed molten prepolymer is adapted to fall along and in contact with the guide, to thereby effect a guide-wetting fall polymerization of the inert gas-absorbed molten prepolymer.

14. The system according to item 13, above, wherein the guide is a wire.

15. The system according to item 13, above, wherein the guide is a wire net.

16. The system according to item 13, above, wherein the guide is a punched plate.

* * * * *